(12) United States Patent
Lee et al.

(10) Patent No.: US 9,483,501 B2
(45) Date of Patent: Nov. 1, 2016

(54) MOBILE TERMINAL AND A METHOD OF CONTROLLING THE MOBILE TERMINAL

(71) Applicant: LG ELECTRONICS INC., Seoul (KR)

(72) Inventors: Jeonghyun Lee, Seoul (KR); Jaemoo Lee, Seoul (KR); Kyungmin Cho, Seoul (KR); Minah Song, Seoul (KR); Jongkyeong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/341,603

(22) Filed: Jul. 25, 2014

(65) Prior Publication Data

US 2015/0178318 A1    Jun. 25, 2015

(30) Foreign Application Priority Data

Dec. 20, 2013  (KR) ......................... 10-2013-0160657

(51) Int. Cl.
| | |
|---|---|
| H04N 5/225 | (2006.01) |
| G06F 17/30 | (2006.01) |
| H04N 1/21 | (2006.01) |
| H04N 5/232 | (2006.01) |

(52) U.S. Cl.
CPC ........ *G06F 17/30265* (2013.01); *H04N 1/212* (2013.01); *H04N 1/2116* (2013.01); *H04N 1/2125* (2013.01); *H04N 1/2166* (2013.01); *H04N 5/23245* (2013.01); *H04N 5/23293* (2013.01)

(58) Field of Classification Search
CPC .......... G06F 17/30265; H04N 1/2166; H04N 1/2116; H04N 1/212; H04N 5/23923; H04N 1/2125; H04N 5/23245
USPC ................................ 348/220.1, 222.1, 231.3
See application file for complete search history.

(56) References Cited

U.S. PATENT DOCUMENTS

| | | | |
|---|---|---|---|
| 2002/0197067 A1* | 12/2002 | Ohnishi ............... | G11B 27/105 386/230 |
| 2003/0002851 A1 | 1/2003 | Hsiao et al. | |
| 2006/0077263 A1 | 4/2006 | Hosoda | |
| 2006/0120692 A1* | 6/2006 | Fukuta ................. | G11B 27/105 386/230 |
| 2009/0309988 A1* | 12/2009 | Kubo ................... | H04N 1/2104 348/220.1 |
| 2011/0102616 A1 | 5/2011 | Migiyama et al. | |
| 2012/0151401 A1 | 6/2012 | Hwang | |
| 2013/0147810 A1* | 6/2013 | Guldogan .......... | H04N 5/23296 345/473 |
| 2013/0307771 A1 | 11/2013 | Parker et al. | |
| 2014/0380230 A1* | 12/2014 | Venable .................. | G06F 3/013 715/781 |

FOREIGN PATENT DOCUMENTS

| | | |
|---|---|---|
| EP | 1 791 357 A1 | 5/2007 |
| EP | 2 600 220 A2 | 6/2013 |

OTHER PUBLICATIONS

European Search Report issued in Application No. 14188001.3 dated Apr. 29, 2015.

* cited by examiner

*Primary Examiner* — Yogesh Aggarwal
(74) *Attorney, Agent, or Firm* — Ked & Associates, LLP

(57) ABSTRACT

Provided is a mobile terminal including: a camera; and a controller that captures a moving image using the camera, in which wherein in response to a control command that is applied in a state where the moving image is captured using the camera, the controller captures a static image, and after the capturing of the static image is completed, the controller performs processing that associates at least one portion of the captured moving image with the static image in such a manner that information on the at least one portion of the captured moving image is provided along with the captured static image.

19 Claims, 19 Drawing Sheets

MOBILE TERMINAL AND A METHOD OF CONTROLLING THE MOBILE TERMINAL

CROSS-REFERENCE TO RELATED APPLICATION

Pursuant to 35 U.S.C. §119(a), this application claims the benefit of earlier filing date and right of priority to Korean Application No. 10-2013-0160657, filed on Dec. 20, 2013, the contents of which is incorporated by reference herein in its entirety.

BACKGROUND OF THE DISCLOSURE

1. Field of the Disclosure

The present disclosure relates to a mobile terminal that is capable of capturing an image and a moving image and a method of controlling the mobile terminal.

2. Background of the Disclosure

A terminal is broadly categorized by mobility into a mobile terminal and a stationary terminal. The mobile terminal is further categorized by portability into a handheld terminal and a vehicle-mounted terminal.

In response to an increasing demand for diversified functions, the terminal has been realized in the form of a multimedia player with multiple functions such as shooting a photographic object as a still image or moving images, reproducing digital audio and video compression files, playing a game, receiving a broadcast or the like.

In addition, it is considered that the mobile terminal is equipped with various user interfaces that meet the needs of a user of the mobile terminal. For example, the mobile terminal is equipped with an interface by which that light reflected from objects is recorded and digital processing is performed to generate an image frame or a sequence of image frames that is captured as a static image or a moving image on a display unit of the mobile terminal.

The recent mobile terminals are equipped with a function of providing additional information relating to the static image and the moving image. Such additional information is called tag information. The pieces of "tag" information includes user information included in the static image or the moving image, and the like. Thus, it is necessary to explore methods by which various pieces of "tag information" are provided.

SUMMARY OF THE DISCLOSURE

Therefore, an aspect of the detailed description is to provide information on a situation where a static image is captured, as a moving image, to the static image.

To achieve these and other advantages and in accordance with the purpose of this specification, as embodied and broadly described herein, there is provided a a mobile terminal including: a camera; and a controller that captures a moving image using the camera, based on the fact that a predetermined condition is satisfied, wherein in response to a control command that is applied in a state where the moving image is captured in the background, the controller captures a static image, and after the capturing of the static image is completed, the controller performs processing that associates at least one portion of the captured moving image with the static image and provides information on the at least one portion of the captured moving image, along with the captured static image.

In the mobile terminal, the controller may match with the static image one portion of the captured moving image that has been captured for a predetermined time, with a point in time at which the control command is applied serving as a reference.

The mobile terminal may further include a display unit to which the captured static image is output, in which the controller may output a graphic object indicating that the at least one portion of the captured moving image is associated with one region of the static image being output.

In the mobile terminal, when a touch is applied to the graphic object, the controller may output one portion of the moving image that is associated with the static image.

In the mobile terminal, if one portion of the moving image that corresponds to the static image is output while the moving image is reproduced, the controller may perform different visual processing the one portion of the moving image than when the other portions of the moving image are output, in such a manner that the static image corresponding to the one portion of the moving image is obtained.

In the mobile terminal, when the outputting of one portion of the moving image that is associated with the static image is finished, the controller may output the static image with which the one portion of the moving image is associated, back to the display unit.

In the mobile terminal, the controller may recognize pupils of user's eyes using the camera, and in response to detection of the recognized pupils as being fixed on the static image for a predetermined time, the controller may reproduce one portion of the moving image that is processed to be associated with the static image.

The mobile terminal may further includes a display unit to which the captured static image is output, in which when the capturing of the static image is completed, the controller may output to one portion of an output region of the display unit multiple graphic objects that correspond to time periods at which the moving image is captured, respectively, in order that one portion of the moving image that is processed to be associated with the static image is selected, and in which when a predetermined-type touch is applied to at least one or more, among the multiple graphic objects, the controller may perform processing that associates with the static image one portion of the captured moving image that corresponds to the graphic object to which the predetermined-type touch is applied.

In the mobile terminal, the at least one portion of the moving image that is processed to be associated with the static image may be one portion of the moving image that corresponds to one already-selected portion of the static image.

The mobile terminal may further include a display unit to which the captured static image is output, in which when a predetermined-type touch is applied to one portion of the static image being output, the controller may extract at least one portion of the moving image that corresponds to the one portion of the captured moving image, to which the touch is applied, and may perform processing that associates the one extracted portion of the moving image with one portion of the static image.

In the mobile terminal, a graphic object indicating that the one extracted portion of the moving image is associated may be output to the vicinity of one portion of the static image with which the one extracted portion of the moving image is associated.

In the mobile terminal, when a predetermined-type touch is applied to the graphic object, the controller may output the one extracted portion of the moving image to one portion of an output region of the display unit, which corresponds to the one portion of the static image.

The mobile terminal may further includes a display unit to which image frames that result from recording light reflected from objects and performing digital processing are sequentially output, in which the controller may enlarge one portion of the image frame when a touch is applied to one portion of an output region of the display unit, the controller may capture the static image, based on a control command that is applied in a state where the one portion of the image frame is enlarged, and the controller may perform processing that associates at least one portion of the moving image that is captured from the image frames that are sequentially output from the camera and that are not enlarged, with the static image that is captured in the state where the one portion of the image frame is enlarged, regardless of the enlarged static image.

In the mobile terminal, when a control command for outputting at least one portion of the moving image that is associated with the enlarged static image is applied, the controller may output the at least one portion of the moving image, and while the at least one portion of the moving image is output, the enlarged static image may be output to one portion of the output region of the display unit.

In the mobile terminal, the number of the cameras each of which has a different image-capturing direction may be two or greater, one camera, among the at least two cameras, may capture the moving image and the other camera may capture the static image, based on a control command that is applied while the one camera captures the moving image, and the controller may perform processing that associates the moving image captured by the other camera with the static image captured by the one camera in such a manner that information relating to the moving image is provided to the static image.

In the mobile terminal, in response to activation of the camera, the moving image may be captured in the background.

To achieve these and other advantages and in accordance with the purpose of this specification, as embodied and broadly described herein, there is provided a method of controlling a mobile terminal, including: activating a camera; capturing a moving image in the background using the camera, based on the fact that a predetermined condition is satisfied in a state where the camera is activated; capturing a static image while capturing of the moving image is in progress in the background, based on the fact that a user request is received; associating at least one portion of the captured moving image with the static image after the capturing of the static image is completed; and providing information relating to the one associated portion of the moving image along with the captured image.

In the method, the at least one portion of the moving image that is associated with the static image may be one portion of the moving image that has been captured for a predetermined time, with a point in time at which the user request is received serving as a reference.

The method may further include outputting the captured static image to a display unit, in which a graphic object indicating that the at least one portion of the moving is associated with the captured static image may be output to one portion of an output region of the display unit.

In the method, when a predetermined-type touch is applied to the graphic object, the at least one portion of the moving image that is associated with the static image may be output.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present invention will be explained in more detail with reference to the attached drawings. The suffixes attached to components of the wireless speaker, such as 'module' and 'unit or portion' were used for facilitation of the detailed description of the present invention. Therefore, the suffixes do not have different meanings from each other.

The mobile terminal according to the present invention may include a smart phone, a laptop computer, a digital broadcasting terminal, a Personal Digital Assistant (PDA), a Portable Multimedia Player (PMP), a navigation system, etc.

Figure 1:
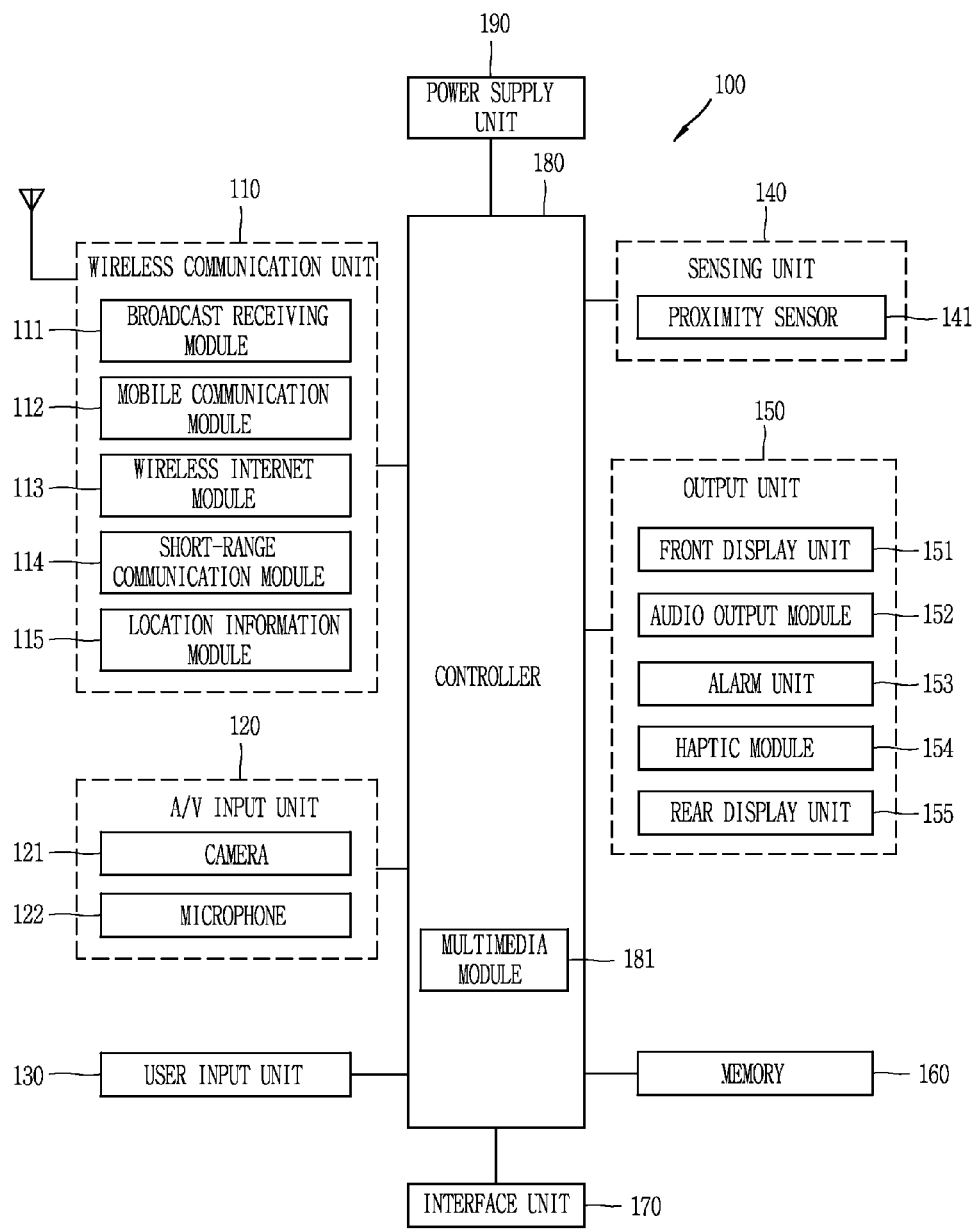
FIG. 1 is a block diagram illustrating a mobile terminal according to one embodiment of the present invention.

FIG. 1 is a block diagram of a mobile terminal according to an embodiment of the present invention.

As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), ZigBee™, Near Field Communication (NFC) and the like.

The location information module 115 is a module for acquiring a location (or position) of the mobile communication terminal. For example, the location information module 115 may include a GPS (Global Positioning System) module.

Referring to FIG. 1, the A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display 151.

The image frames processed by the camera 121 may be stored in the memory 160 or transmitted via the radio communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display 151, an audio output module 152, an alarm unit 153, a haptic module 154, and the like.

The display 151 may display information processed in the mobile terminal 100. For example, when the mobile terminal 100 is in a phone call mode, the display 151 may display a User Interface (UI) or a Graphic User Interface (GUI) associated with a call. When the mobile terminal 100 is in a video call mode or image capturing mode, the display 151 may display a captured image and/or received image, a UI or GUI.

The display 151 may include at least one of a Liquid Crystal Display (LCD), a Thin Film Transistor-LCD (TFT-LCD), an Organic Light Emitting Diode (OLED) display, a flexible display, and a three-dimensional (3D) display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more displays 151. The rear surface portion of the display 151 may also be implemented to be optically transparent. Under this configuration, a user can view an object positioned at a rear side of a body through a region occupied by the display 151 of the body.

The display 151 may be implemented in two or more in number according to a configured aspect of the mobile terminal 100. For instance, a plurality of displays may be arranged on one surface integrally or separately, or may be arranged on different surfaces.

Here, if the display 151 and a touch sensitive sensor (referred to as a touch sensor) have a layered structure therebetween, the structure may be referred to as a touch screen. The display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area of a touch object, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display 151 has been touched.

Referring to FIG. 1, a proximity sensor 141 may be arranged at an inner region of the mobile terminal covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The audio output module 152 may output audio data received from the radio communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. The video signal or audio signal may be output through the display 151 or the voice output module 152. Therefore, the display 151 and the voice output module 152 may be categorized as part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a structure of the mobile terminal of FIG. 1 according to an embodiment of the present invention will be explained.

Figure 2A:
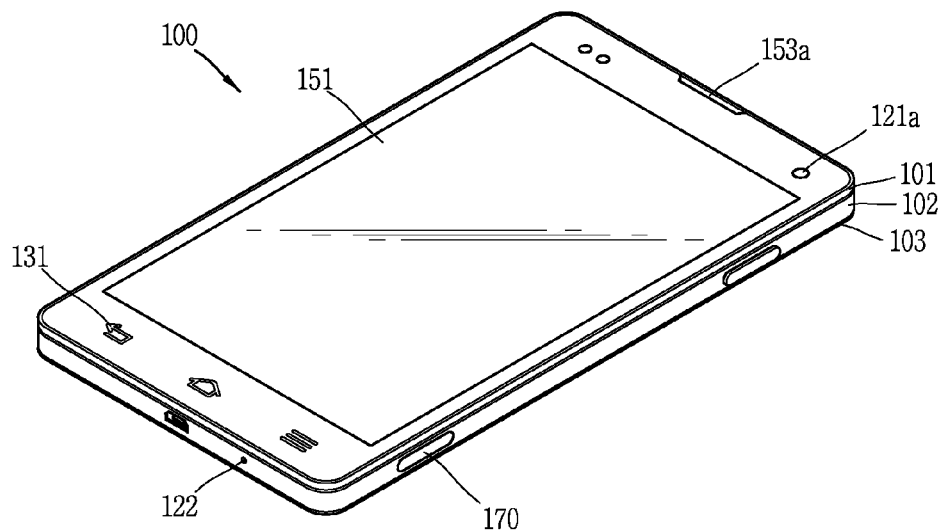
FIG. 2A is a perspective diagram illustrating one example of the mobile terminal according to one embodiment of the present invention when viewed from front.
Figure 2B:
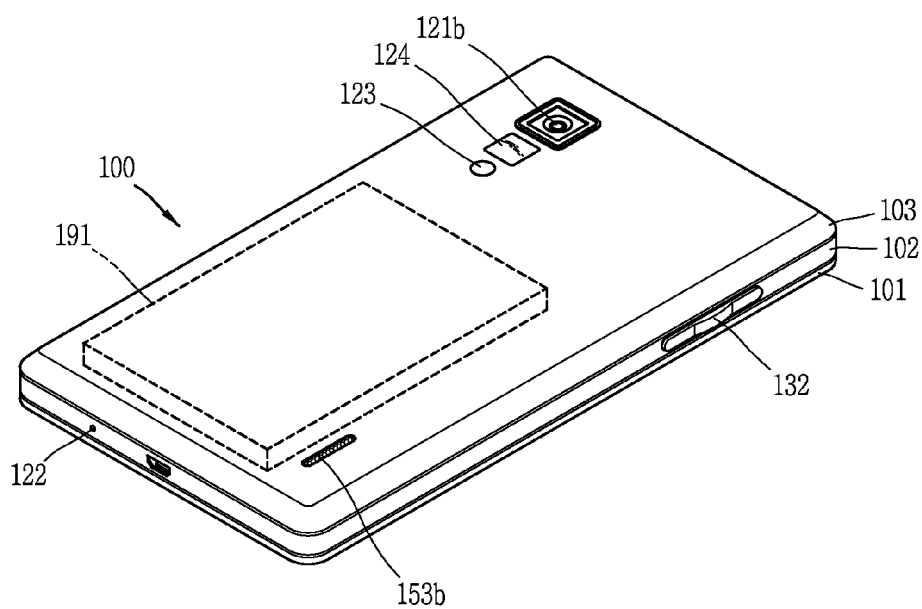
FIG. 2B is a perspective diagram illustrating one example of the mobile terminal according to one embodiment of the present invention when viewed from rear.

FIG. 2A is a front perspective view of the mobile terminal according to an embodiment of the present invention, and FIG. 2B is a rear perspective view of the mobile terminal according to an embodiment of the present invention The mobile terminal 100 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A body of the mobile terminal 100 has a front surface, side surfaces and a rear surface. The body has two ends in a lengthwise direction.

A case (casing, housing, cover, etc.) forming an outer appearance of the body 100 may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display 151, an audio output unit 152, a camera 121, user input units 130/131 and 132, a microphone 122, an interface unit 170, etc.

The display 151 occupies most parts of a main surface of the front case 101. The audio output unit 152 and the camera 121 are arranged at a region adjacent to one end of the stereoscopic display 151, and the user input unit 131 and the microphone 122 are arranged at a region adjacent to another end of the display 151. The user input unit 131, the interface unit 170, etc. may be arranged on side surfaces of the front case 101 and the rear case 102. The microphone 122 is disposed at another end of the body 100.

The user input unit 130 is manipulated to receive a command for controlling the operation of the mobile terminal 100, and may include a plurality of manipulation units 131 and 132. The manipulation units may be referred to as manipulating portions, and may include any type of ones that can be manipulated in a user's tactile manner.

Commands inputted through the first or second user input units 131 and 132 may be variously set. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display 151 to a touch recognition mode.

Referring to FIG. 2B, an audio output unit 152' may be additionally disposed at the rear case 102. The audio output unit 152' may implement a stereo function together with the audio output unit 152 (refer to FIG. 2A), and may be used for calling in a speaker phone mode.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display 151, the touch pad 135 may be formed to be light-transmissive. In this case, if the display 151 is configured to output visual information from two surfaces thereof, the visual information can be recognized through the touch pad 135. The information output from the two surfaces can be controlled by the touch pad 135. Alternatively, a display may be additionally mounted to the touch pad 135, so that a touch screen can be disposed at the rear case 102.

A camera 121' may be additionally provided on the rear case 102. The camera 121' faces a direction which is opposite to a direction faced by the camera 121 (refer to FIG. 2A), and may have different pixels from the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed at the body 100 so as to rotate or pop-up.

A flash 123 and a mirror 124 may be additionally disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 252' may be additionally arranged on a rear surface of the body. The audio output unit 252' (refer to FIG. 2A) may cooperate with the audio output unit 252 (refer to FIG. 2A) so as to implement a stereo function. Also, the audio output unit may be configured to operate as a speakerphone.

A power supply unit 190 for supplying power to the mobile terminal 100 is mounted to the body. The power supply unit 190 may be mounted in the body, or may be detachably mounted to the body.

In addition, the mobile terminal according to one embodiment of the present invention, which is capable of including at least one or more among the constituent elements as described above, is capable of capturing an image using a camera.

Figure 3:
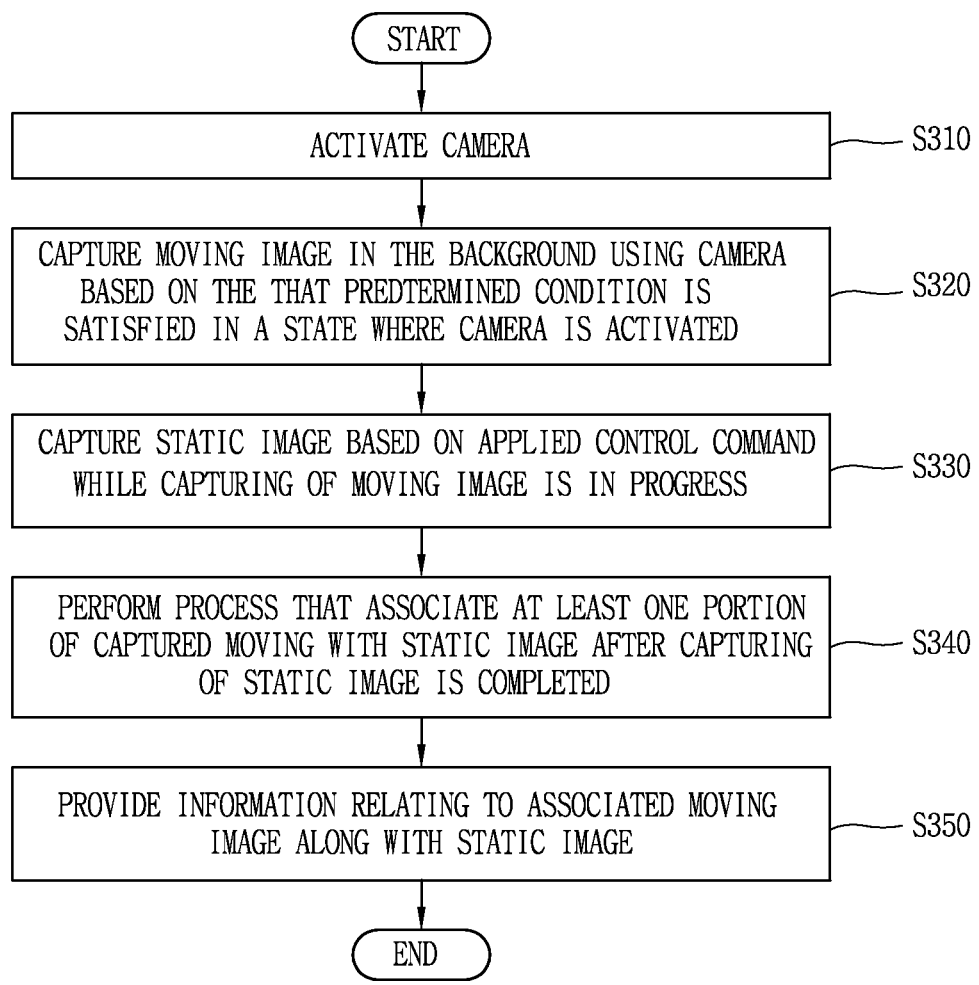
FIG. 3 is a flow chart illustrating a control method of performing processing that associates one portion of a moving image with a static image in the mobile terminal according to one embodiment of the present invention.
Figure 4A:
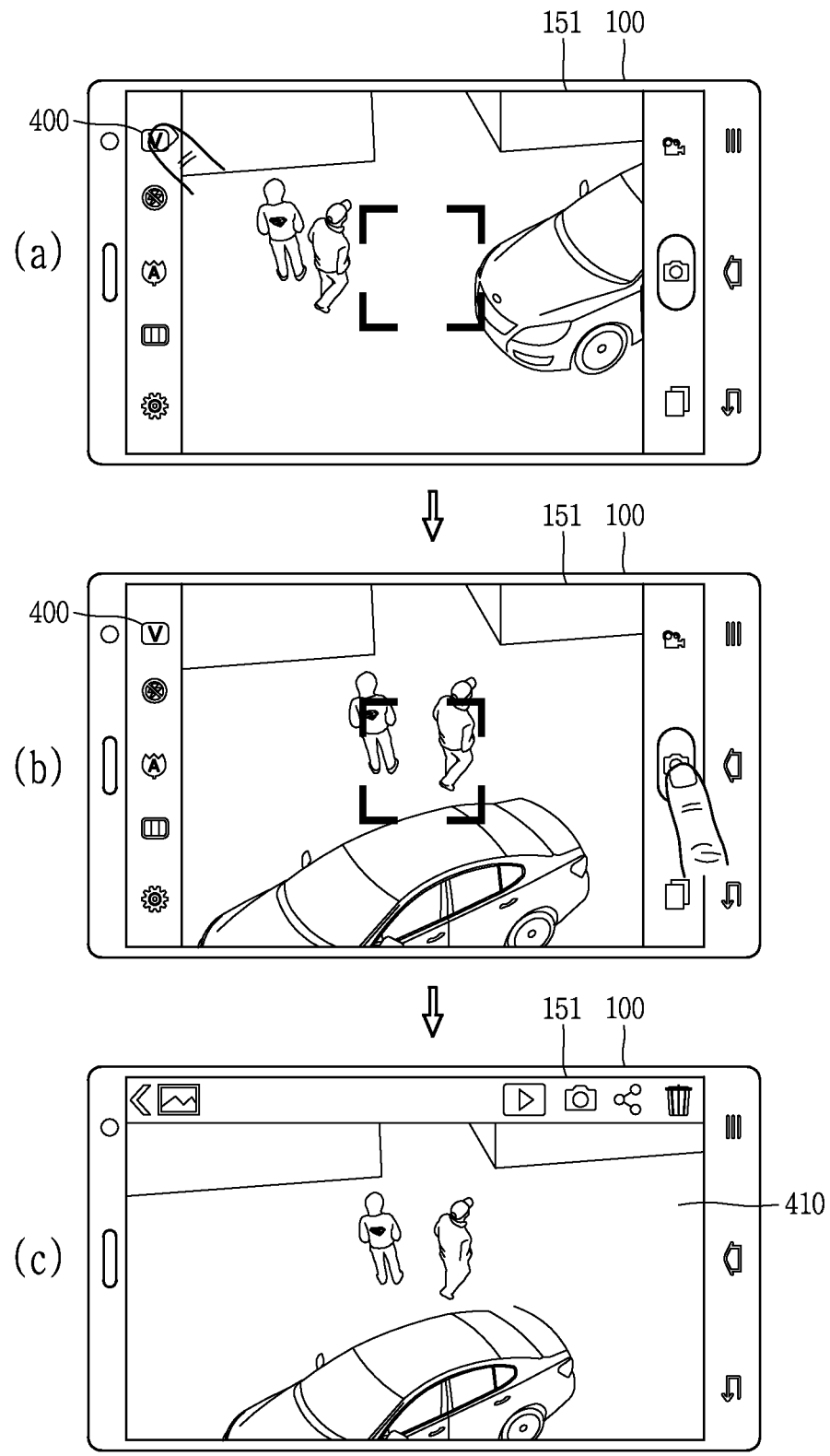
FIGS. 4A(a) to 4A(c) and 4B(a) to 4B(d) are diagrams illustrating the control method in FIG. 3.

Referring to the drawings, a method is described below in which when capturing a static image using the camera, one portion of a moving image that relates to a point in time at which the static image is captured is tagged. FIG. 3 is a flow chart illustrating a method of processing that associates one portion of a moving image with the captured static image in the mobile terminal according to one embodiment of the present invention. FIGS. 4A(a) and 4B(d) are diagrams illustrating a method of outputting one portion of the moving image on which association processing is performed.

In the mobile terminal according to one embodiment of the present invention, a camera 121' provided in the mobile terminal is activated (S310, and based on the fact that a predetermined condition is satisfied in an activated state of the camera, proceeding to a step of capturing a moving image in the background using the camera 121' takes place (S320).

At this point, that the camera 121' records light reflected from objects and thus performs digital processing to generate an image frame, or a sequence of image frames. The image frame or the sequence of image frames that results from the digital processing in the camera 121' are displayed on the display unit 151 in order to be captured as a static image or a moving image. The camera 121' is activated in an image capture mode.

A controller 180 activates the camera 121' provided in the mobile terminal in order to capture the static image using the camera 121'. At this point, when the camera 121' is activated to capture the static image, the controller 180 captures one portion of the moving image that is to be associated with the captured static image.

When an application relating to the capturing of the image is executed, the controller 180 activates the camera 121'. The application relating to the capturing of the image is executed by applying a touch to an icon corresponding to the application relating to the capturing of the image.

When the camera 121' is activated, based on the fact that a predetermined condition is satisfied, the controller 180 captures the moving image in the background using the camera 121'. At this time, the predetermined condition is a condition that a user control command for capturing the moving image in the background be applied or that the camera 121' be activated to capture the static image.

The user control command that captures the moving image in the background is issued by applying a touch input to a graphic object for receiving a command that images the moving image in the background. The graphic object is output to one region of the display unit 151.

The capturing of the image in the background is always performed independently of execution of the other functions in a state where the image capturing using the camera 121' is not recognized by the user. That is, the controller 180 always performs the capturing of the moving image using the camera 121' regardless of whether or not the other functions are executed.

On the other hand, if the capturing of the moving image in the background is performed, an execution screen relating to the capturing of the moving image is not output to the display unit 151. Therefore, the user cannot know that the capturing of the moving image is in progress. Therefore, in order to alert the user that the camera 121' is activated and thus the capturing of the moving image is in progress, the controller 180 outputs alerting information, which indicates that the capturing of the moving image is in progress, to one region of the display unit 151 (for example, a status display bar).

In addition, in order to associate one portion of the captured moving image with the static image, the controller 180 may temporarily store in a memory unit 160 at least one portion of the moving image.

At this time, the controller 180 may temporarily store the entire captured moving image in the memory unit 160. In addition, the controller 180 may temporarily store one portion of the moving image in the memory unit 160. That is, when the capturing of the moving image is in progress, the controller 180 temporarily stores in the memory unit 160 only one portion of the moving image that is captured within a predetermined time after a point in time at which the capturing of the moving image starts. At this time, portions of the moving image that are not captured within the predetermined time, that is, portions of the moving image that are stored before the predetermined time are deleted from the memory unit 160. When this is done, the controller 180 prevents the large-sized moving image from being stored in the memory unit 160.

On the other hand, when the processing relating to the moving image is finished, one portion of the moving image that is temporarily stored in the memory unit 160 is finished, the one portion of the moving image is deleted from the memory unit 160.

Subsequently, in the mobile terminal according to one embodiment of the present invention, in response to a control command that is applied in a state where the capturing of the moving image is in progress, proceeding to a step of capturing the static image takes place (S330).

When the predetermined condition is satisfied in the state where the camera 121' is activated to capture the static image, the controller 180 captures the moving image. At this time, the moving image is captured in the background in such a manner that the user cannot recognize that the capturing of the moving image is in progress. That is, while capturing the moving image the controller 180 performs the capturing of the moving image and does not display on the display unit 151 an indication that an operation of storing one portion of or all of the moving image in the memory unit 160 is performed.

At this time, the image frames that results from the digital processing in the camera 121' are sequentially output on the display unit 151 in order to be captured as the static image. In a state where the image frames are sequentially output to the display unit 151, the user can apply to the display unit 151 a control command for capturing the static image from the image frames that are sequentially output. At this point, the control command includes various types of commands, such as a touch command, a voice command, and a gesture command, that can be recognized by the mobile terminal.

When the control command is applied, the controller 180 captures the static image. At this time, the image frame from which the static image that is captured is the image frame that is digitally-processed in the camera 121' when the control command is applied.

In the mobile terminal according to one embodiment of the present invention, after the capturing of the static image is finished, proceeding to a step of associating at least one portion of the captured moving image with the static image (S340).

After the capturing of the static image is finished in response to the applied control command, the controller 180 associates at least one portion of the moving image with the static image. When this is done, according to the present invention, information relating to at least one associated portion of the moving image is provided along with the static image.

That is, the controller 180 matches at least one portion of the moving with the static image and outputs at least one matched portion of the moving image together when outputting the static image. At this time, the matching of one portion of the moving image with the static image is defined as tagging of one portion of the moving image onto the static image. At this point, an expression "tagging" means mapping information (for example, person information including an image) relating to arbitrary information with the arbitrary information and outputting the matched (or tagged) information along with the arbitrary information. At this time, the user can search for information relating to the arbitrary information more easily using the matched information, and can make use of the searched-for information.

At least one portion of the moving image that is associated with the static image is one portion that satisfies a predetermined condition, of the captured moving image, or a moving image that is set by the user selection. At this point, one portion that satisfies the predetermined condition, of the captured moving image, is a moving image that has been captured a for a predetermined time after the control command for capturing the static image is applied. For example, one portion that satisfies the predetermined condition, of the captured moving image, is a moving image that has being captured for 2 seconds before a point in time at which the control command for the capturing of the static image is applied and for 8 seconds after the point in time at which the control command for the capturing of the static image is applied.

At this time, the predetermined time is set by the user before or after the capturing of the static image.

If at least one portion of the moving image is associated with the static image, the static image and at least one portion of the moving image are stored together in the memory 160. At this time, there are two storing manners. One is that the static image and at least one portion of the moving image are stored as one file. The other is that the static image and at least one portion of the moving image are stored as separate files and information on connection between the static image and at least one portion of the moving image are stored together. The manner in which the static image and at least one portion of the moving image are stored in the memory unit 160 is determined with setting that is provided when a function of associating one portion of the moving image to the static image is performed.

If at least one portion of the moving image is associated with lthe static image, the controller 180 outputs a graphic object indicating that the one portion of the moving image is associated, to one region of the static image that is output.

The graphic object may be continuously output on one region of the static image and may be output based on the fact that a predetermined touch is applied. For example, the graphic object is output in response to application of a user touch to the static image. At this time, the graphic object remains output only for a predetermined time, and when the predetermined time elapses, disappears from display unit 151. That is, when the touch is not applied to the static image, the user can view the static image without the graphic object.

In the mobile terminal according to one embodiment of the present invention, after performing processing that associates at least one portion of the moving image with the static image, proceeding to a step of providing information relating to the associated portion of the moving image along with the static image takes place (S350).

If among the multiple static images that are stored in the memory unit 160, the static image with which one portion of the moving image is associated is output to the display unit 151, the controller 180 outputs the information relating to the associated portion of the moving image is output along with the static image.

That is, if at least one portion of the moving image is associated with the static image, the controller 180 outputs the at least one portion of the moving along with the static image. When this is done, the user can be provided with at least one portion of information relating to the static image, along with the static image.

At least one portion of the moving image that is associated with the static image is output in response to a predetermined condition is satisfied in a state where the static image is displayed on the display unit 151. At this point, an expression "the moving image is output" means that the moving image is reproduced or that an execution screen that relates to the reproducing of the moving image is output. In addition, the predetermined condition is described in detail below referring to FIGS. 6A(a) to 6B(c).

At least one portion of the moving image that is associated with the static image is output to at least one portion of an output region of the display unit 151.

If at least one portion of the moving image that is associated with the static image is output, the controller 180 outputs the static image which which the at least one portion of the moving image is associated, among the multiple static images that make up the at least one portion of the moving image, in a manner that distinguishes it from the other static images. This is done in order for the user to recognize the static image with which the at least one portion of the moving image is associated. Methods of distinguishably outputting the static image include visual, auditory and haptic methods. For example, while reproducing the moving image, the controller 180 outputs the static image with which one portion of the moving image is associated, among the multiple static images that make up the at least one portion of the moving image, in a manner that changes color of the static image with which one portion of the moving image is associated. This is done in order to distinguish the static image with which one portion of the moving image is associated, from the other static images.

On the other hand, the controller 180 edits at least one portion of the moving image that is associated with the static image, independently of the static image. That is, the controller 180 performs processing, such as deleting, sharing, and setting-changing, on at least one portion of the moving image that is associated with the static image, independently of the static image.

For example, in the editing of the moving image, the moving images are set differently that have been captured before and after the point in time at which the control command for capturing the static image is applied. For example, the user can set the moving image that is captured before the point in time at which the control command is applied, to be in black-and-white, and can set the moving image that is captured after the point in time at which the control command is applied, set to be reproduced at a low speed. That is, the controller 180 assigns different setting values to the moving images that are captured before and after the point in time at which the control command is applied, respectively. This is done in order for the user to know the point in time at which the static image is captured and to feel an effect of visual amusement.

When the reproducing (or outputting) of at least one portion of the moving image that is associated with the static image is finished, the controller 180 no longer outputs the one portion of the moving image to the display unit 151. At this time, the static image with which one portion of the moving image is associated is output back to the display unit 151.

The control method described above referring to FIG. 3 is described in detail below referring to FIGS. 4A(a) to 4B(d).

As described in FIG. 4A(a), the user can activate the camera 121' in order to capture the static image using the camera 121'. The camera 121' records light reflected from objects and thus performs digital processing to generate the image frames. At this time, the image frames generated in the camera 121' are output to the display unit 151.

When a predetermined condition is satisfied in a state where the image frames that result from the digital processing in the camera 121' is output to the display unit 151, the controller 180 captures the moving image. At this point, the predetermined condition is a condition that a user request be present or the camera 121' be activated. The user request is received in various manners, such as a touch, a voice, and a gesture. For example, as illustrated in FIG. 4A(a), when the touch input is applied to a graphic object 400 for receiving the control command for receiving the moving image in the background, the controller 180 starts to capture the moving image.

At this time, the moving image is captured in the background in such a manner that the user cannot recognize that the capturing of the moving image is in progress. In addition, by the activation of the camera 121' or by the user request, the moving image starts to be captured. For example, as illustrated in FIG. 4A(a), when the touch input is applied to a graphic object for performing the capturing of the moving image, the controller 180 starts to capture the moving image.

While the capturing of the moving image is in progress, based on the applied control command, the controller 180 captures the static image using the camera 121' The control commands include a voice command, a touch command, a gesture command, and the like. For example, as illustrated in FIG. 4A(b), the user can capture a static image 410 by applying the touch to the display unit 151.

After capturing the static image 410, the controller 180 performs processing that associates at least one portion of the moving image with the static image 410. That is, the controller 180 matches at least one portion of the moving image with the captured static image 410 in such a manner that information relating to the at least one portion of the moving image is provided along with the static image 410.

At least one portion of the moving image that is associated with the static image 410 is one portion of the moving image that has been captured for a predetermined time or one portion of the moving image that is determined by the user selection. At this time, the predetermined time means a time that is predetermined with a point in time at which the control command for the capturing of the static image is applied serving as a reference. For example, at least one portion of the moving image that is associated with the captured static image 410 is one portion of the moving image that has been captured for 5 seconds before the point in time at which the control command for the capturing of the static image is applied and 3 seconds after the point in time at which the control command for the capturing of the static image is applied.

If at least one portion of the moving image is associated with the static image 410, the controller 180 outputs the at least one portion of the moving image that is associated with the static image 410, along with the static image 410. At this time, the at least one portion of the moving image is output to at least one portion of the output region of the display unit 151. In addition, the at least one portion of the moving image is output to the entire output region of the display unit 151.

Figure 4B:
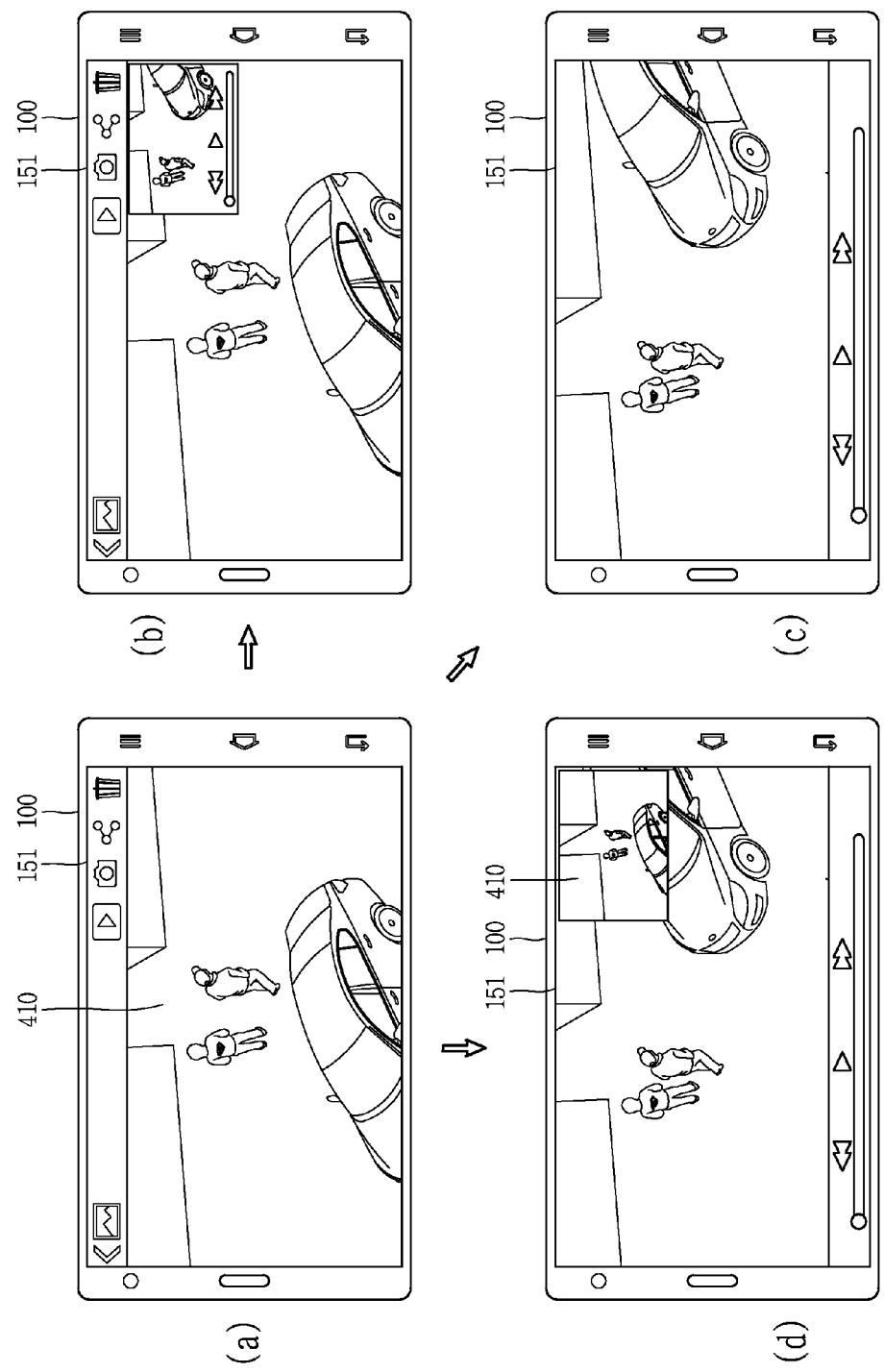

For example, as illustrated in FIG. 4B(b), the controller 180 outputs to one region of the static image 410 at least one portion 420 of the moving image that is associated with the static image, in a state where the static image 410 is output to the display unit 151. In such a case, the user can view, at a time, the static image 410 and the at least one portion 420 of the moving image that is associated with the static image 410.

As another example, as illustrated in FIG. 4B(c), the controller 180 outputs to the entire output region of the display unit 151 at least one portion 430 of the moving image that is associated with the static image (410). In such a case, the user can view one portion of the moving image that is associated with the static image, which is output to a larger portion of the output region of the display unit 151.

In addition, as illustrated in FIG. 4B(d), a moving image is output to the entire output region of the display unit 151, the controller 180 outputs a static image 440 to at least one region of the moving image in such a manner that the static image 440 is superimposed onto the at least one region of the moving image. In such a case, the user can view one portion of the moving image that is output to the larger portion of the output region of the display unit 151, and at the same time, can view the static image with which the one portion of the moving image is associated.

The method is described above in which in order to provide the information relating to at least one portion of the moving image that is captured together when the static image is captured, to the static image, the at least one portion of the moving image is associated with the static image. According to the present invention, when this is done, a method is provided in which a user's impression on surroundings at the time of capturing the static image is well preserved along with the static image.

Figure 5A:
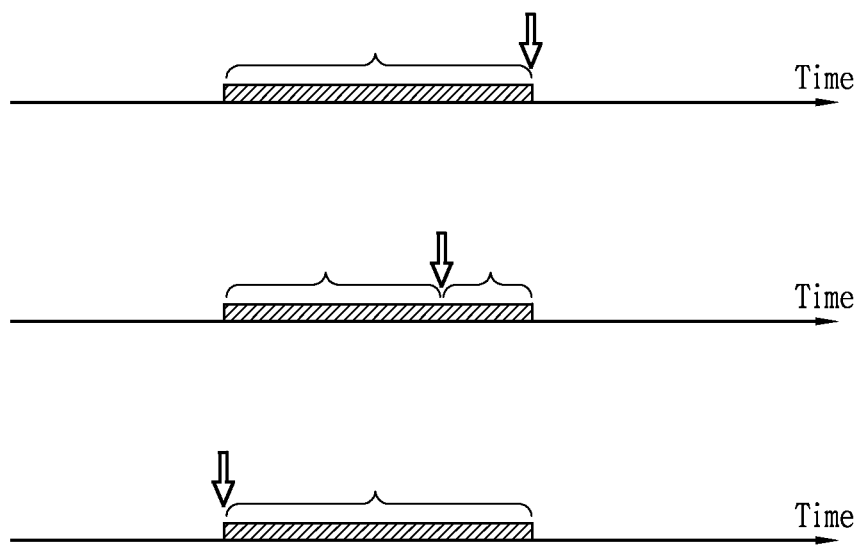
FIGS. 5A and 5B(a) to 5B(c) are diagrams illustrating a method of selecting one portion of the moving image that is to be processed to be associated with the static image.
Figure 5B:
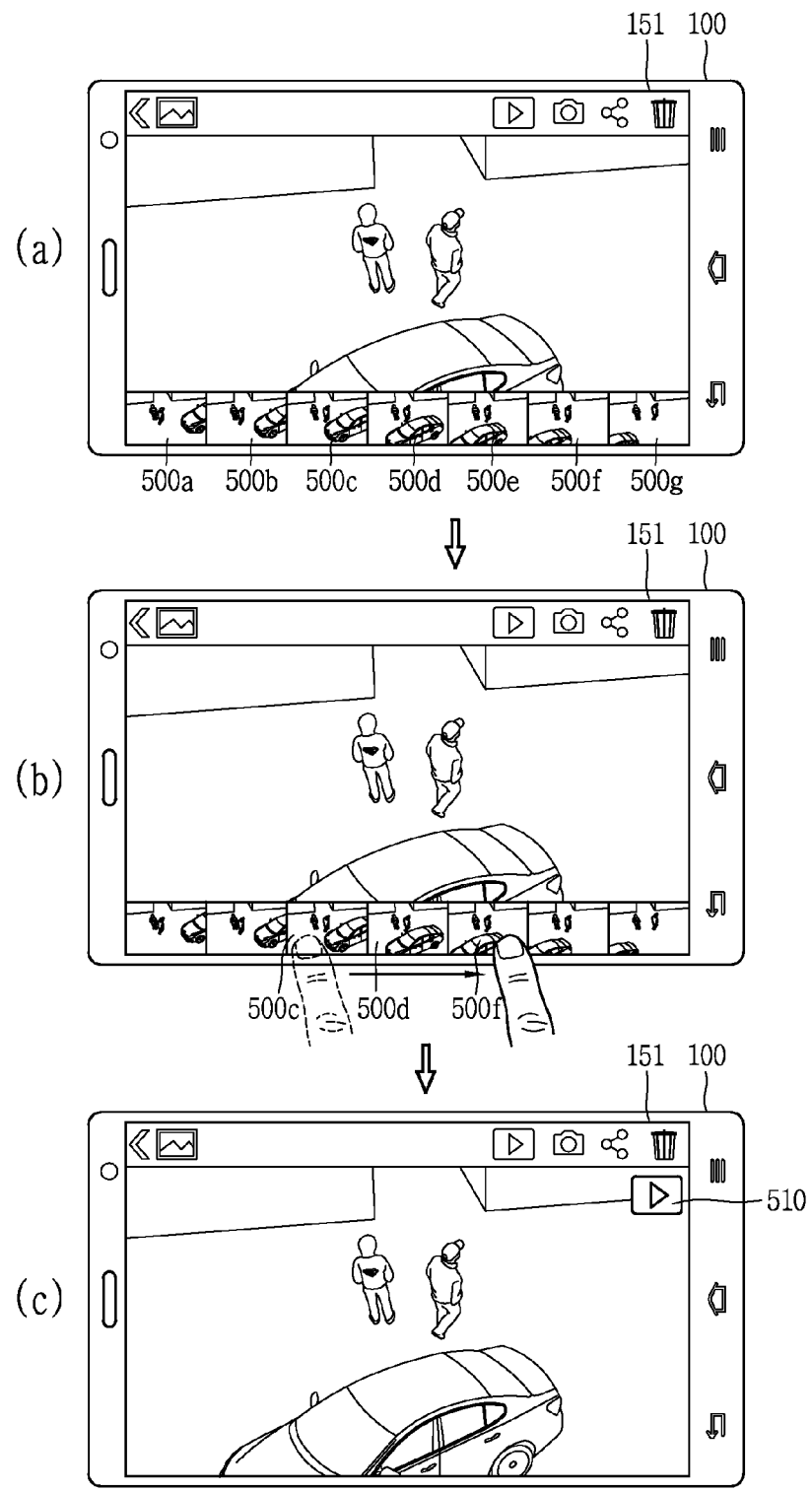

A method of setting at least one portion of the captured moving image that is associated with the static image is described below. FIGS. 5A to 5B(c) are diagrams for describing a method of setting at least one portion of the moving image that is captured using the camera.

When the camera 121' is activated to capture the static image, the controller 180 captures the moving image in the background using the camera 121'. At this time, when the capturing of the static image is completed, the controller 180 performs processing that associates at least one portion of the captured moving image with the static image.

At this time, at least one portion of the moving image, which is processed to be associated with the static image is one portion of the moving image that has been captured for a predetermined time. At this time, the predetermined time is provided by the user before or after the capturing of the static image. That is, before the capturing of moving image, the predetermined time is provided with the point in time at which the control command for the capturing of the static image is applied serving as the reference.

For example, as illustrated in FIG. 5A, before the capturing of the static image, the user can set one portion of the moving image that is to be associated after the capturing of the static image. To do this, the controller 180 outputs to the display unit 151 screen information relating to setting of the time for capturing the moving image. Thus, before the capturing of the static image, the user can set one portion of the moving image that is to be associated with the static image.

For example, one portion of the moving image that is to be associated with the static image is at least one portion of the moving image, among one portion of the moving image that has been captured for a predetermined time among portions of the moving image that have been captured before the point in time at which the control command for the capturing of the static image is applied, a combination portion of one portion of the moving image that has been captured for a predetermined time among portions of the moving image that have been captured before the point in time at which the control command is applied and one portion of the moving image that has been captured for a predetermine time among portions of the moving image that have been captured after the point in time at which the control command is applied, and one portion of the moving image that has been captured from the point in time at which the control command is applied.

In addition, the at least one portion of the moving image is set by the user after the capturing of the static image. When the capturing of the static image is completed, the controller 180 outputs to one portion of the output region of the display unit 151 multiple graphic objects that correspond to the times at which the portions of the moving image have been captured, respectively. For example, as illustrated in FIG. 5B(a), in a state where the captured static image is output to the display unit 151, thumb nail images 500*a*, 500*b*, 500*c*, 500*d*, 500*e*, and 500*f* that correspond to the times at which the portions of the moving image have been captured are output to one portion of the output region of the display unit 151.

At this time, the user can select at least one portion of the captured moving image that is to be associated with the static image, by applying a predetermined-type touch to one of the multiple graphic objects. At this time, the predetermined-type touch is a drag input that is applied to the multiple graphic objects. For example, as illustrated in FIG. 5B(b), the controller 180 applies the drag input to one or more of the thumb nail images 500*c*, 500*d*, and 500*e*, among the multiple thumb nails 500*a*, 500*b*, 500*c*, 500*d*, 500*e*, and 500*f* that are output to the display unit 151.

When the predetermined-type touch is applied to at least one or more of the multiple graphic objects, the controller 180 performs processing that associates with the static image the portions of the moving image that correspond to the at least one or more of the multiple graphic objects, respectively. When the at least one portion of the moving image is processed to be associated with the static image, the multiple graphic objects disappear from the display unit 151. On the other hand, when one portion of the moving image is associated with the static image, the controller 180 outputs to one region of the static image a graphic object 510 indicating that the one portion of the moving image is associated. When this is done, the user can know that one portion of the moving image is associated with the static image.

The method of selecting one portion of the moving image that is to be associated with the static image is described above. According to the present invention, the screen information for selecting one portion of the moving image that is to be associated with the static image is output. When this is done, the user can associate with the static image one portion of the moving image that is captured at his/her favorite time period.

Figure 6A:
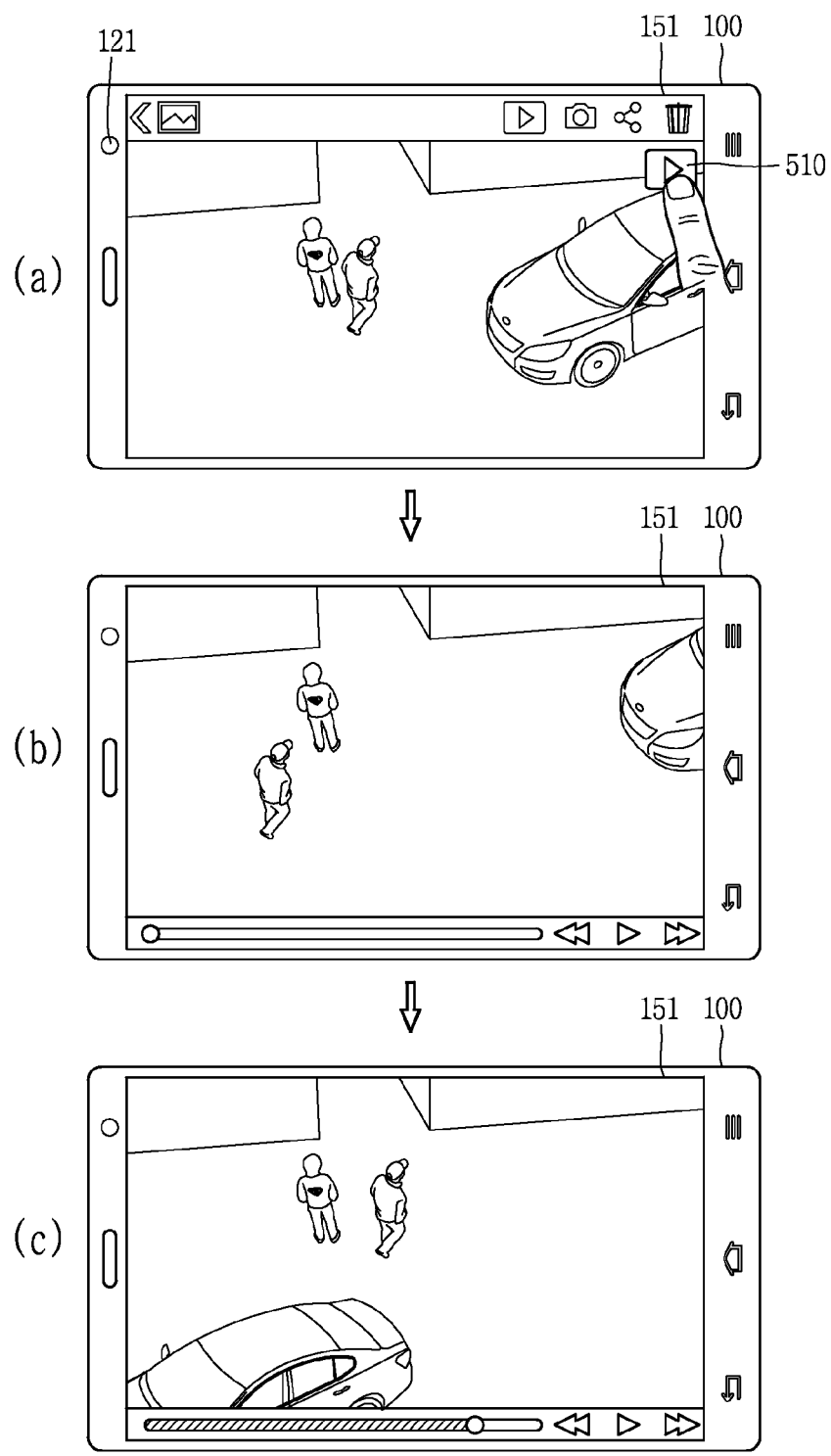
FIGS. 6A(a) to 6A(c) and 6B(a) to 6B(c) are diagrams illustrating a method of reproducing one portion of the moving image is associated with the static image.

A method of outputting one portion of the moving image that is associated with the static image is described below. FIGS. 6A(a) to 6B(c) are diagrams for describing the method of outputting one portion of the moving image that is associated with the static image.

If one portion of the moving image is associated with the static image, the controller 180 outputs the one portion of the moving image along with the static image in order to provide moving-image information along with the static image.

A predetermined control command is applied, the controller 180 outputs one portion of the moving image that is associated with the static image. The predetermined control command is at least one among a touch command and a gesture command. At this point, the gesture command is a gesture command that uses movements of the recognized pupils of user's eyes.

For example, as illustrated in FIG. 6A(a), the user can apply a touch to the graphic object 510 indicating that one portion of the moving image is associated, which is output to one region of the static image.

When the touch is applied, the controller 180 reproduces one portion of the moving image that is associated with the static image. At this time, the one portion of the moving image is output to one region of the static image in a manner that is superimposed onto the one region of the static image, or is output to the entire output region of the display unit 151. For example, as illustrated in FIGS. 6A(b) and 6A(c), when the touch is applied to the graphic object 510, the controller 180 reproduces the one portion of the moving image on the entire output region of the display unit 151.

Figure 6B:
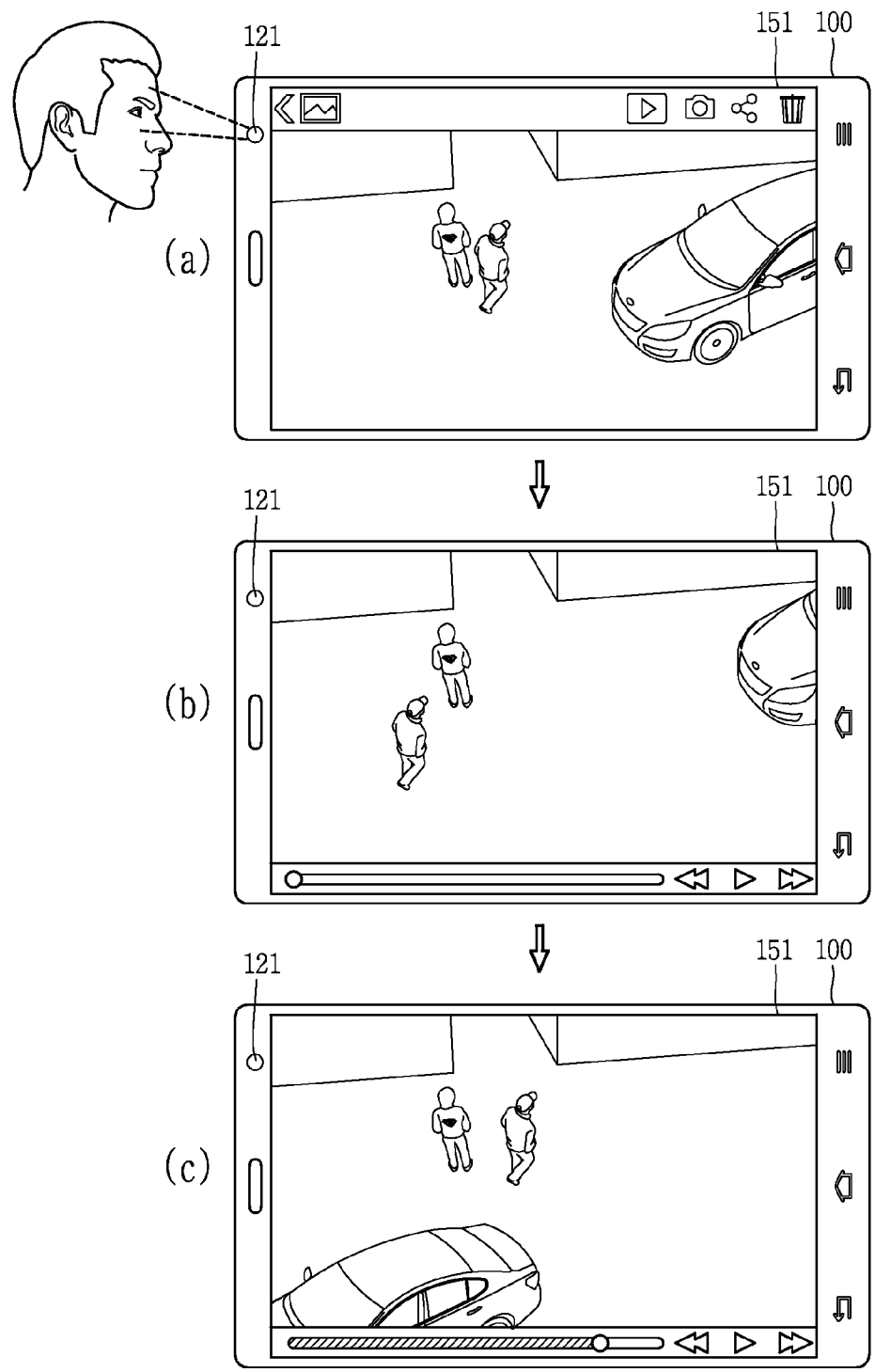

As another example, as illustrated in FIG. 6B(a), the controller 180 recognizes the pupils of the user's eyes using a camera 121 provided in the mobile terminal. More specifically, when an image of a user's face is received from the camera 121, the controller 180 analyzes the image of the user's face, extracts movement directions of the pupils, and thus determines whether or not the gazes of the pupils are fixed on the static image, based on the extracted movement directions.

That is, the controller 180 determines a position on which the gazes of the pupils of the user's eyes are fixed. When it is determined that the gazes falls, for a predetermined time, on a position within an output region of the static image, the controller 180 determines that the gazes of the user's eyes are fixed on the static image.

If the gazes are fixed on the static image, the controller 180 outputs one portion of the moving image that is associated with the static image. That is, the controller 180 determines the movements of the pupils of the user's eyes and thus determines whether or not the user needs additional information relating to the static image. For example, as illustrated in FIGS. 6B(b) to 6B(c), if the pupils of the user's eyes are fixed on the static image for a predetermined time or more, the controller 180 outputs to the display unit 151 one portion of the moving image that is associated with the static image.

In addition, although not illustrated, when a predetermined-type touch is applied to one portion of the moving image that is associated with the static image, the one portion of the moving image is reproduced. The predetermined-type touches includes various types of touches, such as a long touch, a double touch, a multi touch, a drag, and a combination of two or more of them.

For example, the user can apply the long touch to the static image in order to reproduce one portion of the moving image that is associated with the static image. Subsequently, in a state where the long touch is maintained, a thumbnail image of the static image is output to a region of the static image to which the long touch is applied. At this time, in the state where the long touch is maintained, the static image is moved to a specific region by dragging the thumb nail image. At this time, the controller 180 reproduces one portion of the moving image that is associated with the static image that is moved to the specific region.

On the other hand, the case where one portion of the moving image is output to the entire output region of the display unit 151 is described above referring to FIGS. 6A(a) to 6A(c) and 6B(a) to 6B(c), but as described above, may be output in various manners (for example, may be output to one region of the static image).

The method of outputting one portion of the moving image that is associated with the static image is described above. According to the present invention, if the directions of the gazes of the pupils of the user's eyes are recognized and thus it is determined that the gazes are fixed on the static image, one portion of the moving image that is associated with the static image is output. When this is done, the user can view one portion of the moving image that is associated with the static image without applying a separate touch.

Figure 7A:
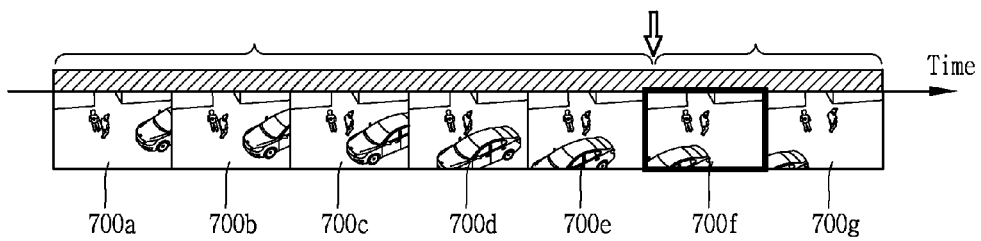
FIGS. 7A, 7B(a) to 7B(c) and 7C(a) to 7C(c) are diagrams a method in which while one portion of the moving image that is associated with the static image is reproduced, the static image with which one portion of the moving image is associated is output in a manner that distinguishes it from the other static images.
Figure 7B:
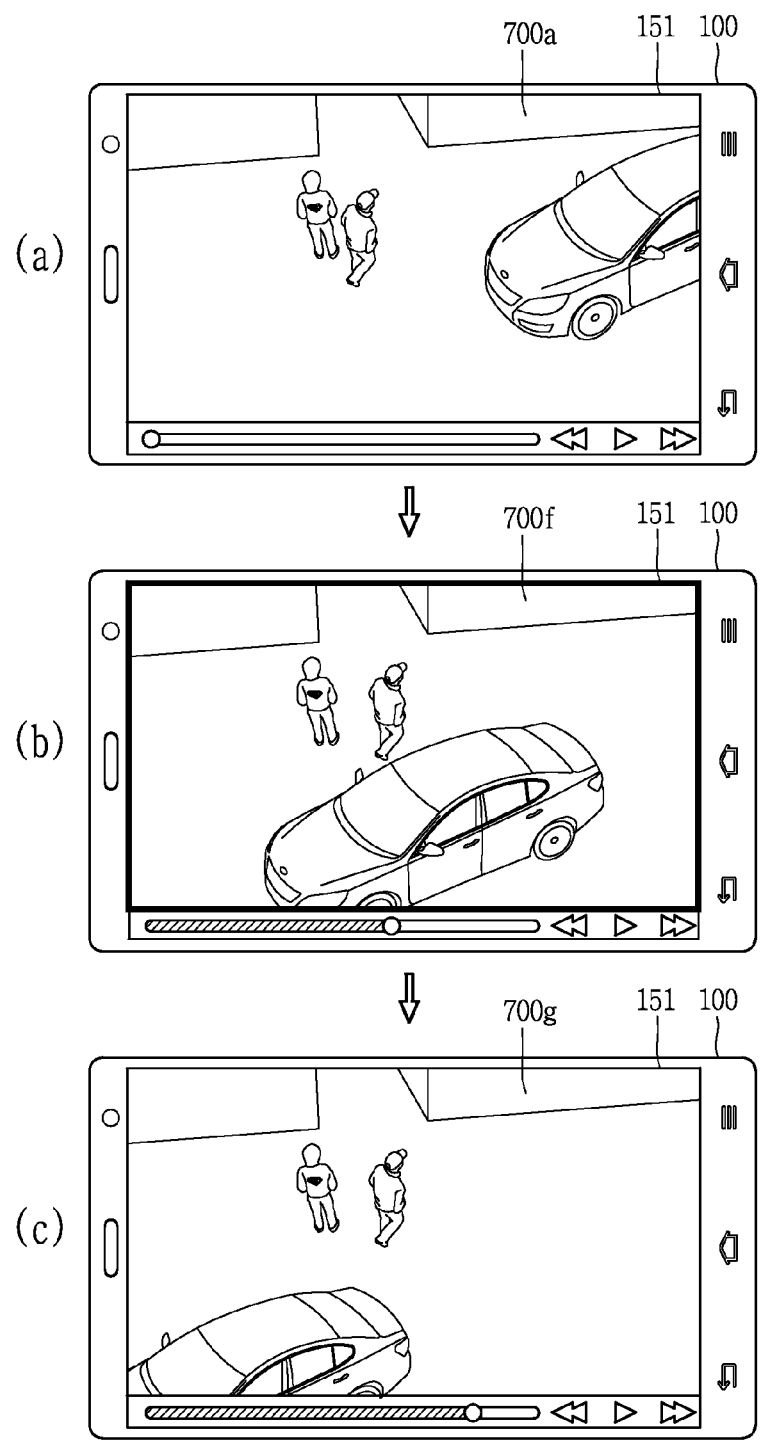

A method is described below in which if the static image with which one portion of the moving image is associated is output while the one portion of the moving image that is associated with the static image is reproduced, the static image with which the one portion of the moving image is associated is output in a manner that distinguishes it from the multiple static images that make up the moving image. FIGS. 7A, 7B(a) to 7B(c) and 7C(a) to 7C(c) are diagrams a method in which if the static image corresponding to the static image with which one portion of the moving image is associated is output while the moving image that is associated with the static image is reproduced, the static image corresponding to the static image with which the one portion of the moving image is associated is output in a manner that distinguishes it from the other portions of the moving image.

At least one portion of the moving image that is processed to be associated with the static image is one portion of the moving image that relates to the static image. That is, the at least one portion of the moving image is one portion of the moving image that is captured by the same camera 121' as the camera that captures the static image, or one portion of the moving image that is captured at the same time period using the same camera 121'. That is, the controller 180 performs processing that associates the moving image the capturing of which was in progress when the static image was captured, in a manner that reminds the user about an atmosphere or a situation where the static image can be captured. Therefore, the static image is included in one portion of the moving image that is processed to be associated with the static image.

When one portion of the moving image is reproduced, the controller 180 outputs the one portion of the moving image in a manner that distinguishes it from the other portions of the moving image in order for the user to recognize the one portion of the moving image that corresponds to the static image. At this time, the controller 180 outputs the static image in a manner that differentiates it visually or aurally from the other static images. For example, if the same static image as the static image with which one portion of the moving image is associated is output while the moving image is reproduced, the controller 180 outputs a sound in order to alert the user to the outputting of the same static image.

As another example, referring to FIG. 7A, among multiple static images 700a, 700b, 700c, 700d, 700e, 700f, and 700g that make up one portion of the moving image that is associated with the static image, the static image 700f with which the one portion of the moving image is associated is output in a manner that differentiates it visually from the other static images 700a, 700b, 700c, 700d, 700e, and 700g. Various methods are available in outputting the static image with which one portion of the moving image to the display unit 151 in a manner that differentiates it visually from the other static images. For example, when a static image corresponding to the static image is output while the moving image is reproduced, the controller 180 generates a blinking effect, a flashing effect of taking a photo, and the like. When this is done, while the one portion of the moving image is reproduced, the user can recognize the static image with which the one portion of the moving image is associated.

At this time, referring to FIG. 7B(a), one portion of the moving image that is associated with the static image is reproduced. If the one portion of the moving image is reproduced, as illustrated in FIG. 7B(b), the static image 700f that corresponds to the static image with which the one portion of the moving image is associated. At this time, when the static image 700f is displayed, the controller 180 outputs the static image 700f in a manner that differentiates it visually from the other static images. For example, the controller 180 outputs a specific image together to the edge portion of the static image 700f.

The case where one portion of the moving image is output to the entire output region of the display unit 151 is described referring to FIGS. 7B(a) to 7B(c), but may be output on one portion of the output region of the display unit 151.

On the other hand, among the multiple static images that make up one portion of the moving image, the controller 180 outputs the static image corresponding to the static image with which the one portion of the moving image is associated, in a manner that differentiates it from the other static images, and in addition to this, outputs one portion of the moving image that has been captured before the point in time at which the static image is captured and one portion of the moving image that has been captured after the point in time at which the static image is captured, also in a manner that differentiates them visually from each other.

That is, the controller 180 provides setting in such a manner that one portion of the moving image that has been captured before the point in time at which the control command for capturing the static image is applied to the one portion of the moving image that is associated with the static image and one portion of the moving that has been captured after the point in time at which the control command is applied have different property values to be applied. The property value is effect information that relates to image distinctness, image-reproducing speed, image color, and image outputting, and the like.

For example, the controller 180 assigns an effect of dimming an image to one portion of the moving image that has been captured before the point in time at which the control command is applied and assigns an effect of decreasing a reproduction speed to one portion of the moving image that has been captured after the point in time at which the control command is applied.

Figure 7C:
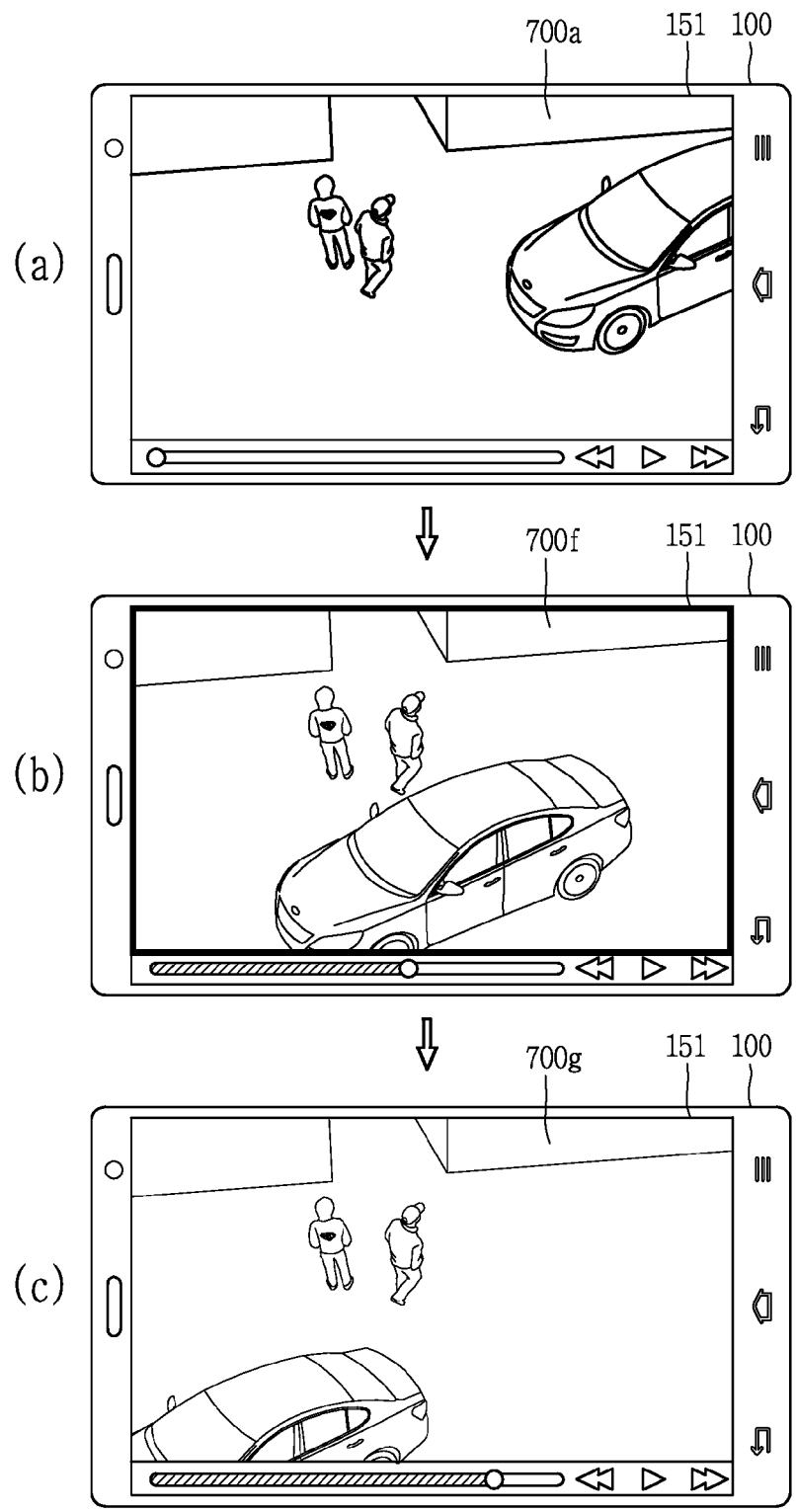

In addition, as illustrated in FIG. 7C(a), one portion of the moving image that has been captured before the point in time at which the control command for capturing the static image is applied is output more distinctively. In addition, as illustrated in FIG. 7C(b), a bold line is displayed on the edge of one portion of the moving image that has been captured at the point in time at which the control command is applied.

Furthermore, as illustrated in FIG. 7C(c), one portion of the moving image that has been captured after the control command is applied is output in a dimmer manner.

The various methods are described above in which while one portion of the moving image that is associated with the static image is reproduced, the user is alerted to the point in time at which the static image is applied. When this is done, while one portion of the moving image that is associated with the static image, the user can know the point in time at which the static image is captured. In addition, the user can produce various visual effects by assigning different property values to one portion of the moving image that has been captured before the static image is captured and one portion of the moving image that has been captured after the static image is captured.

Figure 8A:
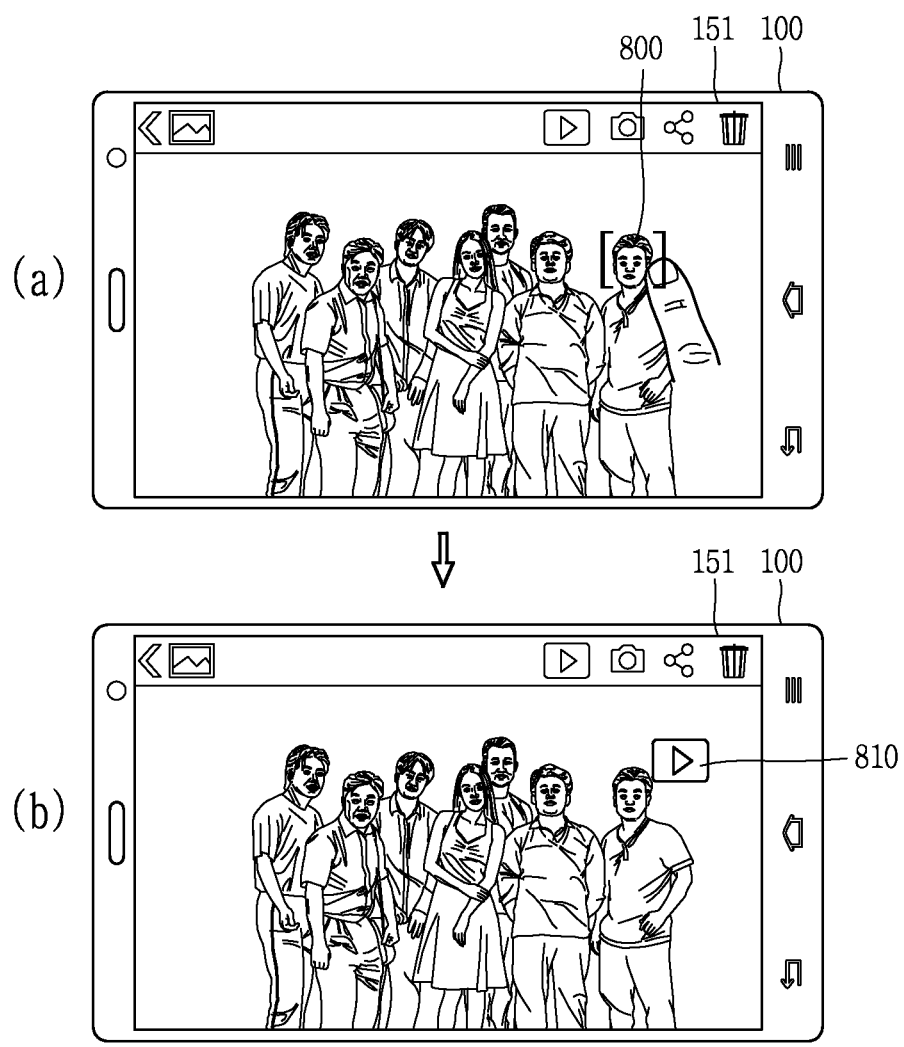
FIGS. 8A(a) and 8A(b) and 8B(a) to 8B(c) are diagrams illustrating a method of performing processing that associates one portion of the moving image with one region of the static image.

A method of associating one portion of the moving image with one region of the static image is described below. FIGS. 8A(a) and 8A(b) and 8B(a) to 8B(c) are diagrams illustrating a method of performing processing that associates one portion of the moving image with one region of the static image.

The controller 180 performs the processing that associates with the entire static image one portion of the moving image that is captured, but may perform the processing that associates with one region of the static image one portion of the moving image that is captured. The one region of the static image is a region to which a predetermined-type touch is applied in a state where the static image is output to the display unit 151. At this time, the predetermined-type touches include a long touch, a double touch, and a drag input that forms a pattern.

When a predetermined-type touch is applied to one region of the static image, the controller 180 extracts at least one portion of the captured moving image that corresponds to the one region of the static image to which the predetermined-type touch is applied.

Subsequently, the controller performs processing that associates the at least one extracted portion of the moving image with one region of the static image to which the predetermined-type touch is applied. That is, the controller 180 performs processing that outputs the one extracted portion of the moving image to the one region of the static image to which the touch is applied in such a manner that in a state where the static image is output, the one extracted portion of the moving image is superimposed onto the one region of the static image.

For example, as illustrated in FIG. 8A(a), the user can apply a predetermined-type touch to one region 800 of the static image that is output to the display unit 151, with which one portion of the moving image is associated. For example, the user can apply the long touch to one region 800 of the static image.

When the predetermined-type touch is applied, the controller 180 extracts at least one portion of the captured moving image, which includes the one region 800 of the static image to which the predetermined-type touch is applied.

Subsequently, the controller 180 performs processing that outputs the at least one extracted portion of the moving image to the one region of the static image to which the predetermined touch is applied. In addition, when one portion of the moving image is associated with the one region of the static image, the controller 180 outputs a graphic object 810 indicating that the one portion of the moving image is associated. At this time, the graphic object 810 is output to the vicinity of the one region of the static image to which the predetermined-type touch is applied.

Figure 8B:
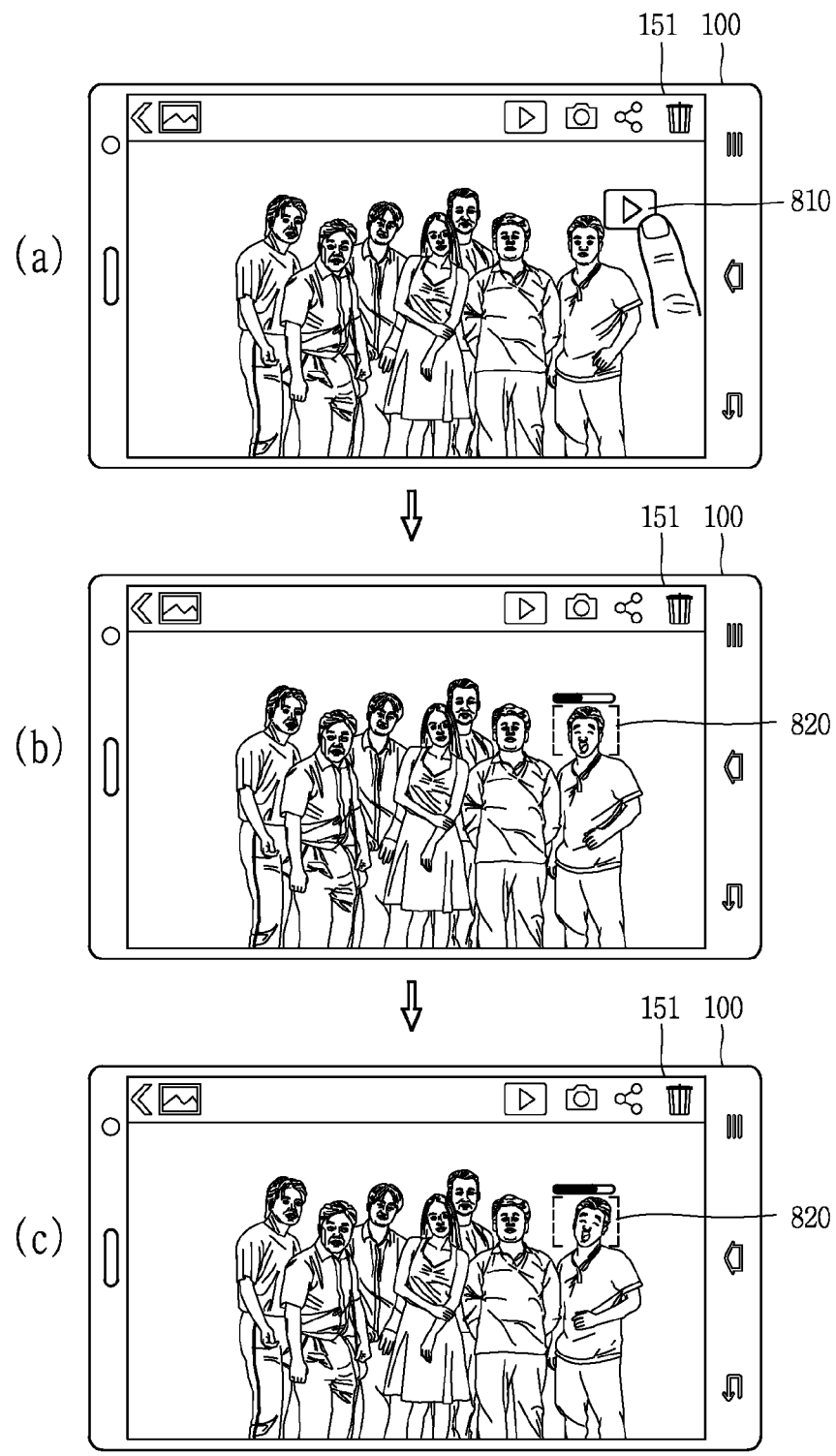

When the touch is applied to the graphic object 810, at least one portion of the moving image, which includes the one region 800 of the static image, is output to the display unit 151. For example, in a state where the static image is output, at least one portion of the moving image, which includes the one region 800 of the static image, is output to the one region 800 of the static image in such a manner that the at least one portion is superimposed onto the one region 800. That is, as illustrated in FIGS. 8B(b) to 8B(c), at least one portion of the moving image, which includes the one region 800 of the static image, is output to the one region 800 of the static image. That is, the user can view one portion of the moving image that is displayed only on one region of the static image. In addition, although not illustrated, at least one portion of the moving image, which includes one region 800 of the static image, is output to an arbitrary portion of the output region of the display unit 151.

The method is described above in which at least one portion of the moving image, which includes one region of the static image, is associated with the one region of the static image. When this is done, the user can view one portion of the moving image that is displayed only on the one region of the static image.

Figure 9A:
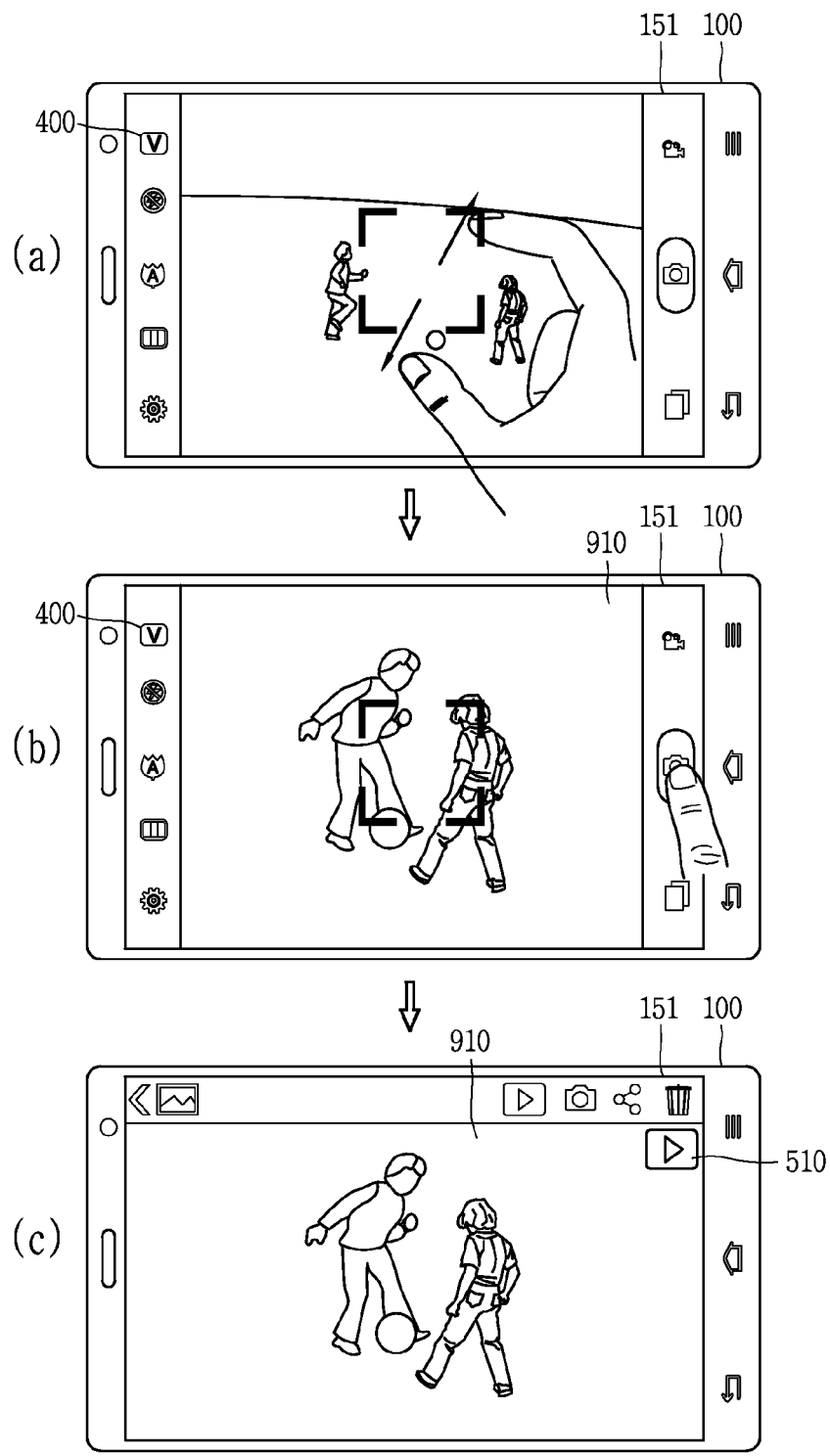
FIGS. 9A(a) to 9A(c) and 9B(a) to 9B(c) are diagrams illustrating a method in which when the enlarged static image is captured, one portion of the moving image that is not enlarged is associated with the enlarged static image.

A method is described below in which when the enlarged static image is captured, one portion of the moving image that is not enlarged is associated with the enlarged static image. FIGS. 9A(a) to 9A(c) and 9B(a) to 9B(c) are diagrams illustrating the method in which when the enlarged static image is captured, one portion of the moving image that is not enlarged is associated with the enlarged static image.

When the camera 121' is activated, the controller 180 outputs to the display unit 151 a sequence of image frames that are processed in the cameras 121' in order to be captured as a moving image on the display unit 151. At this time, the controller 180 captures the moving image in the background using the camera 121' in the activated state of the camera 121'.

With a predetermined-type touch applied to the display unit 151, the controller 180 outputs the image frames sequentially to the display unit 151 in such a manner that they are enlarged or are reduced in size. The predetermined-type touch is a pinch-in input or a pinch-out input.

When the control command for capturing the static image is applied in a state where with the predetermined-type touch, the enlarged image frames are sequentially output to the display unit 151, the controller 180 captures an static image that is enlarged. On the other hand, even though the image frames are output in such a manner that with the predetermined-type touch, they are enlarged, the controller 180 may capture the moving image from the image frames of the original size, regardless of the image frames that are output as are enlarged. That is, the controller 180 captures the moving image from the image frames of the original size that are sequentially received from the camera 121', regardless of whether the image frames that are output to the display unit are enlarged or are reduced in size.

In such a case, the controller 180 associates one portion of the moving image of the original size with the enlarged static image. That is, even though the static image is enlarged and then is captured, the user can know an overall situation where the capturing takes place, using one portion of the moving image that is associated with the static image.

More specifically, as illustrated in FIG. 9A(a), in a state where an image frame 900 that is processed in the camera 121' in order to be displayed on the display unit 151 is output to the display unit 151, the controller 180 detects a predetermined-type touch (for example, the pinch-in) by the user.

As illustrated in FIG. 9A(b), when the predetermined-type touch is applied, in response to the predetermined-type touch, an enlarged image frame 910 is output to the display unit 151. At this time, with the applied control command, the controller 180 captures the static image from the enlarged image frame 910.

At the same time, the controller 180 captures the moving image in the background using the camera 121'. At this time, the captured moving image is a moving image that is not enlarged with the predetermined-type touch.

Subsequently, the controller 180 performs processing that associates at least one portion of the captured moving image with the static image that is captured from the enlarged image frame 910. When one portion of the moving image is associated, the controller 180 outputs the graphic object 510 indicating that the one portion of the moving image is associated with one portion of the static image.

Figure 9B:
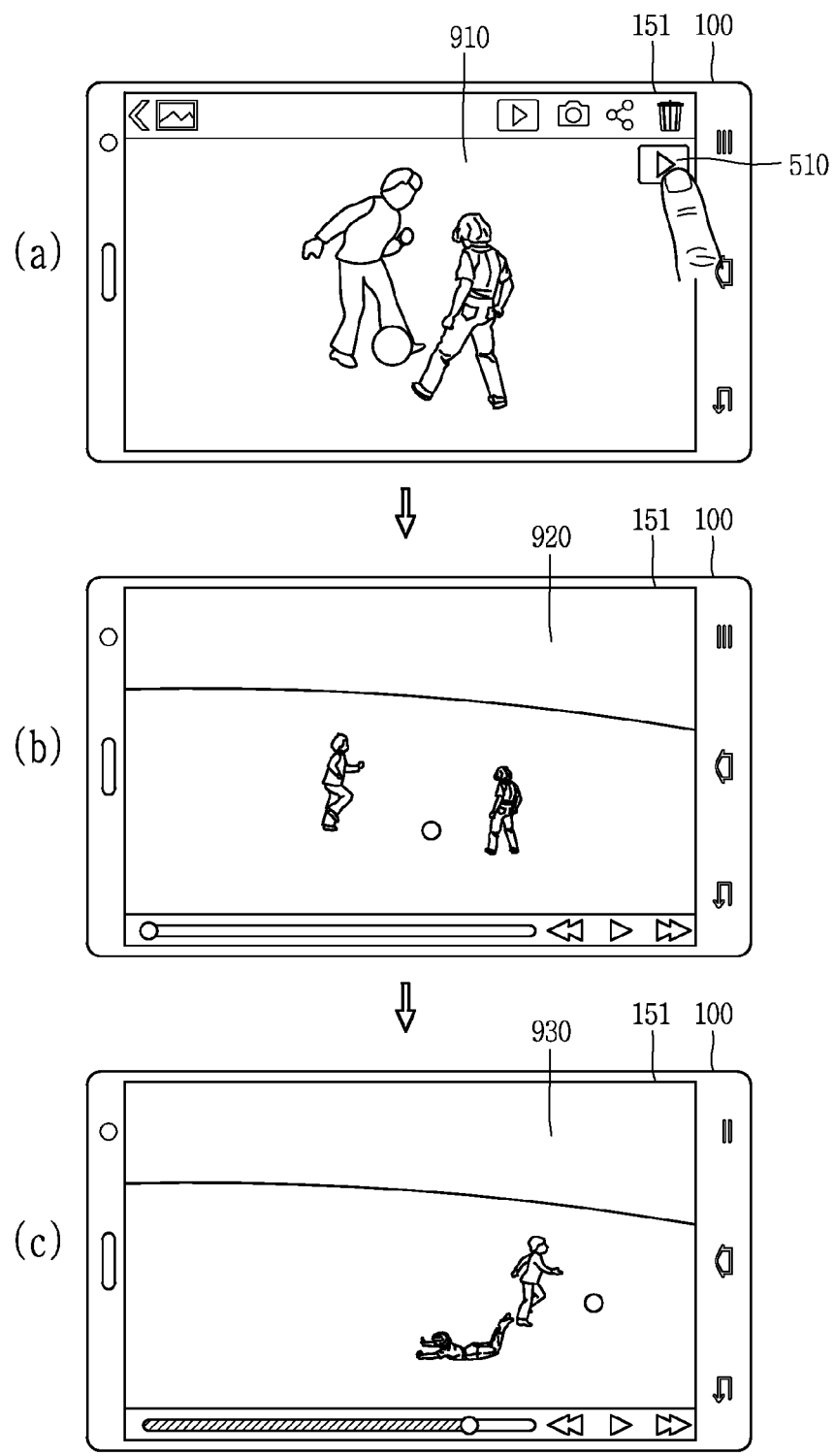

At this time, as illustrated in FIG. 9B(a), when the touch is applied to the graphic object 510, in response to the touch, the controller 180 outputs one portion of the moving image that is associated with the static image that is captured from the enlarged image frame 910. At this time, the moving image that is output may be a moving image that is captured from all the image frames that are sequentially received from the camera 121' before they are enlarged. Accordingly, even though the static image is captured from the enlarged image frame, the user can know an environment where the static image is captured, through the moving image that is captured from all the image frames that are not enlarged.

On the other hand, the method is described above in which one portion of the moving image that is not enlarged is associated also after the image frames are enlarged, but the present invention is not limited to that method. Corresponding to the enlarged image frames, the one portion of the moving image may be enlarged and then may be also captured.

In addition, regardless of whether the image frames are enlarged or is reduced in size, one portion of the moving image may be captured in such a manner that it is enlarged or is reduced in size. A combination of a non-change, increase or reduction in the size of the image frames and a non-change, increase or reduction in the moving image may be set according to the user's selection. For example, conversely, one portion of the moving image that is enlarged may be associated with the static image that is not enlarged.

The control method relating to the increase in the size of the image frames that are received from the camera 121 is described above. According to the present invention, regardless of whether the image frames are enlarged or are reduced in size, one portion of the moving image is captured, and the one portion of the moving image is enlarged or is reduced in size regardless of the image frames. Therefore, the user can associate one portion of the moving image with the static image with various combinations.

Figure 10A:
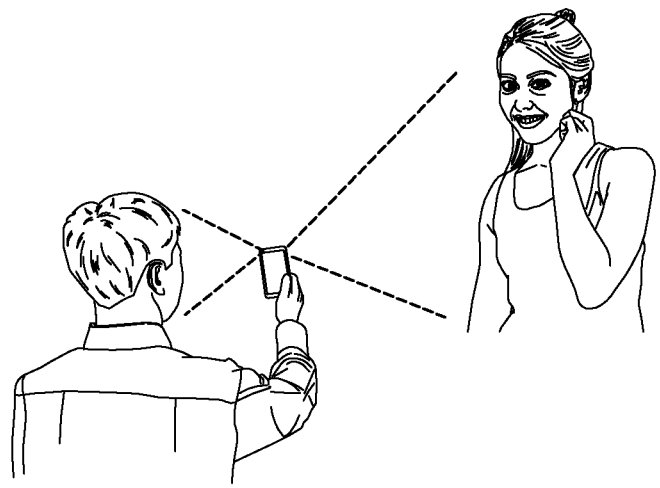
FIGS. 10A and 10B(a) to 10B(d) are diagrams illustrating a method of performing processing that associates one portion of the moving image with the static image using the multiple cameras.
Figure 10B:
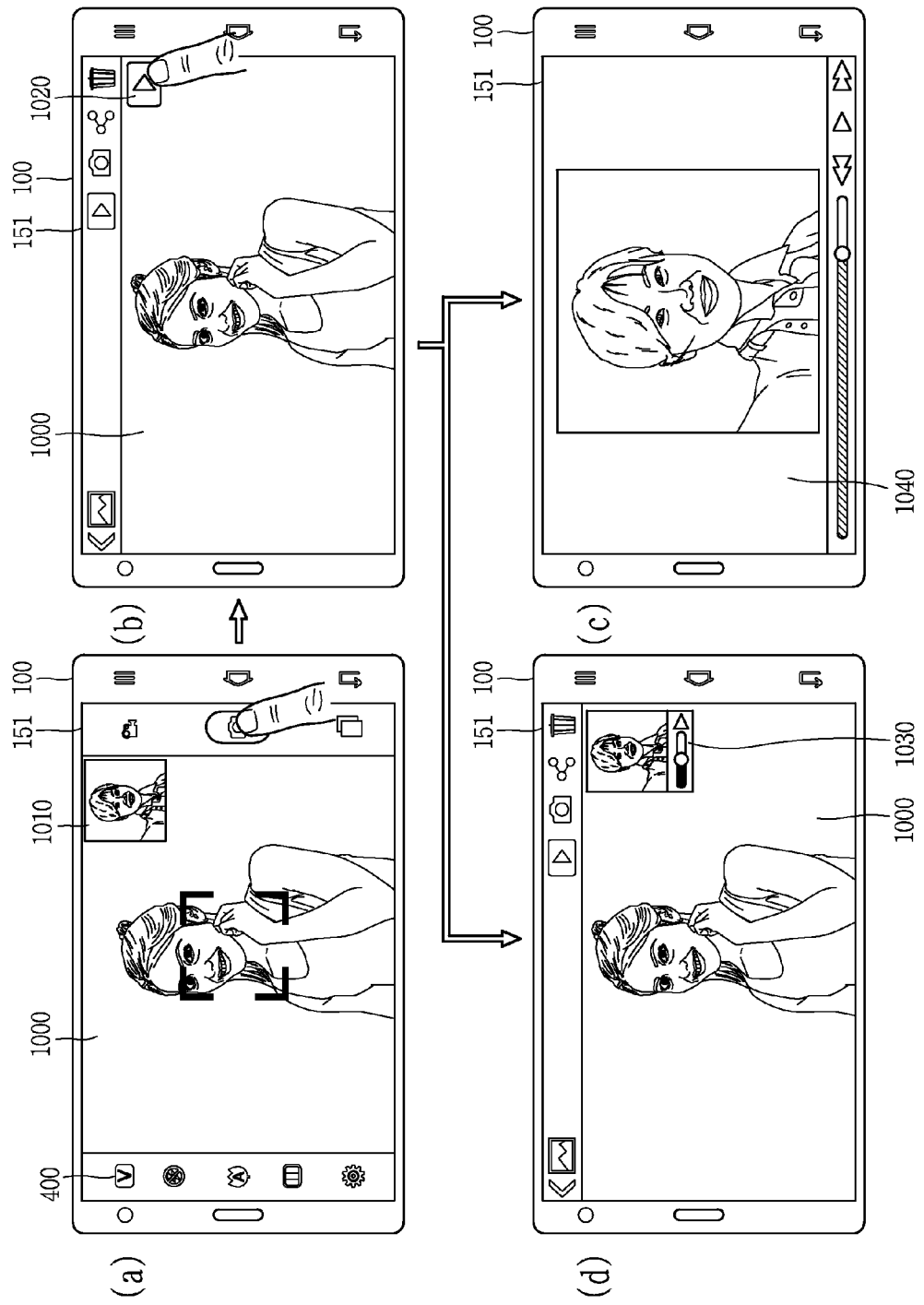

A method of associating one portion of the moving image using the multiple cameras is described below. FIGS. 10A and 10B(a) to 10B(d) are diagrams illustrating a method of performing processing that associates one portion of the moving image with the captured static image using the multiple cameras.

The mobile terminal according to one embodiment of the present invention includes the multiple cameras, each of which has a different image-capture direction. For example, the mobile terminal includes the front-side camera 121 and the rear-side camera 121'.

The front-side camera 121 and the rear-side camera 121' are different in the direction of receiving light reflected from objects. For example, the front-side camera 121 is arranged on the front side of a main body of the mobile terminal to receive light reflected from objects in front of the mobile terminal, and the rear-side camera 121 is arranged on the rear side of the main body of the mobile terminal to receive light reflected from objects in rear of the mobile terminal.

At this time, the controller 180 performs control in such a manner that one camera, among the multiple cameras, captures the moving image. In addition, one camera different from the one camera that captures the moving image, among the multiple cameras, captures the static image.

The controller 180 performs processing that associates one portion of the moving image, which is captured by one camera, with the static camera, which is captured by the different camera. That is, the controller 180 matches at least one portion of the moving image with the static image, and outputs the static image and one portion of the moving image together to the display unit 151 in such a manner that information relating to the one portion of the moving image is provided together.

For example, referring to FIGS. 10B(a) and 10B(b), when the control signal for capturing the static image, one camera, among the multiple cameras, captures the static image. At this time, as well as an image frame 1000 for capturing the static image, image frames 1010 for capturing the moving image are output to the display unit 151 at the same time. That is, the user can view the image frames that result from the digital processing in the different cameras.

The controller 180 matches one portion of the moving image, which is captured by the camera different from the camera that captures the static image, with the static image. Subsequently, when one portion of the moving image is matched, the controller 180 outputs to one portion of the output region of the display unit 151 a graphic object 1020 indicating that the one portion of the moving image is matched.

When the touch is applied to the graphic object 1020, the controller 180 outputs the one matched portion of the moving image. At this time, the one portion of the moving image is output to the static image in such a manner that it is superimposed onto the static image, or only the one portion of the moving is output.

For example, as illustrated in FIG. 10B(c), the moving image is output to one region 1030 of the static image in such a manner that it is superimposed onto the one region 1030 of the static image. In such a case, according to the present invention, the static image and the moving image are viewed together. In addition, as illustrated in FIG. 10B(d), only a moving image 1040 is output to the display unit 151. At this time, the user can view the moving image 1040 in more detail.

The method of associating one portion of the moving image with the static image using the multiple cameras is described above. The user can capture the static image and the moving image from many different angles using the multiple cameras that are different in the image-capturing direction from one another. When this is done, the user can be provided with the various static image and moving image and also a delight to view.

Figure 11:
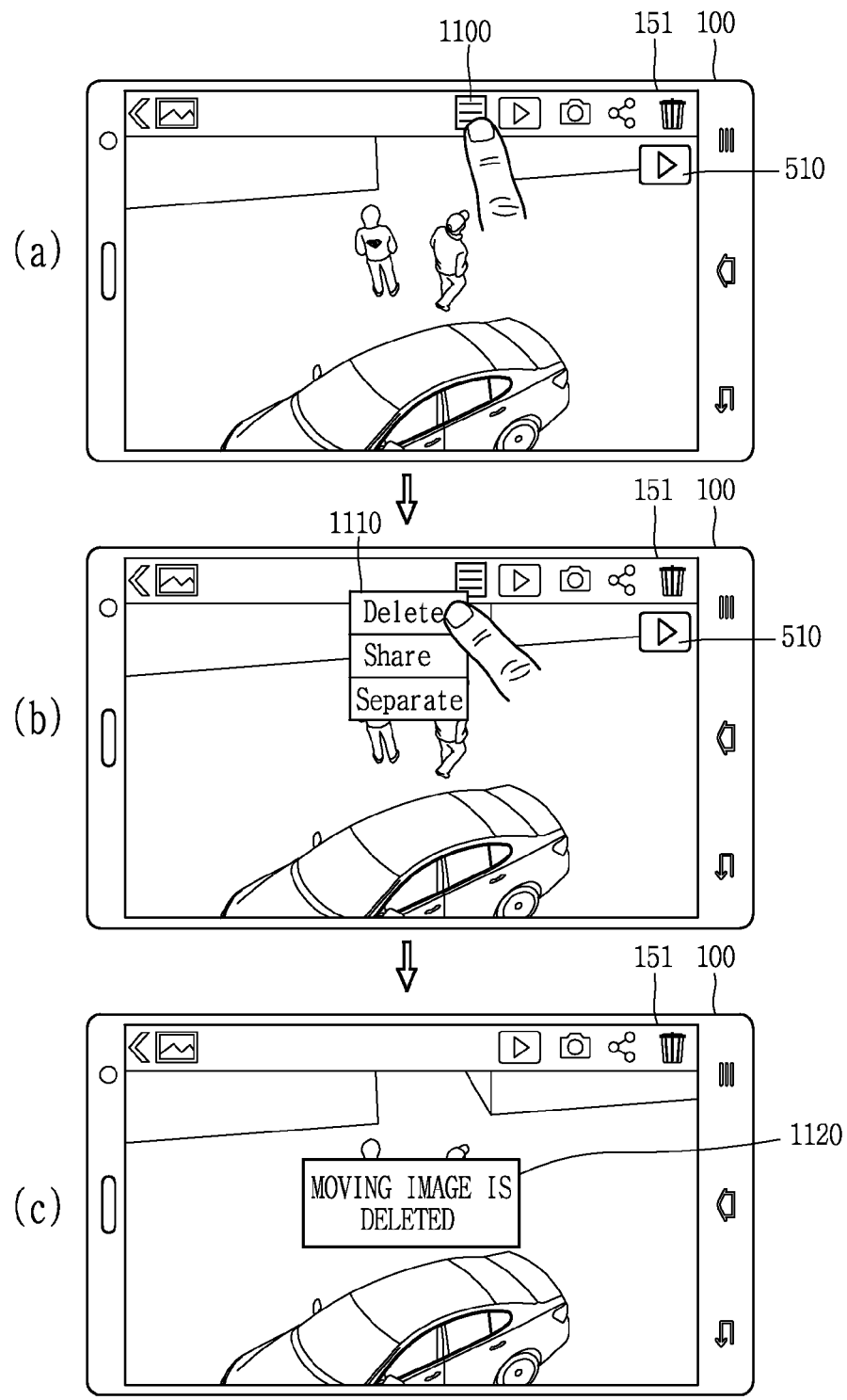
FIGS. 11(a) to 11(c) are diagrams for describing a method of editing one portion of the moving image that is associated with the static image.

A method of editing one portion of the moving image that is associated with the static image is described below. FIGS. 11(a) to 11(c) are diagrams for describing the method of editing one portion of the moving image that is associated with the static image.

The controller 180 performs editing, sharing, and the like on one portion of the moving image that is associated with the static image, separately from the static image. Jobs of editing one portion of the moving image includes separate deleting of only the one portion of the moving image, separating of the one portion of the moving image from the static image, sharing the one portion of the moving image with a different mobile terminal over wireless communication networks, and the like.

In addition, by editing the static image, the controller 180 edits one portion of the moving image that is associated with the static image. That is, when the static image is deleted from the memory unit 160, the controller 180 deletes together one portion of the moving image that is associated with the static image. In addition, the controller 180 may not delete one portion of the moving image that is associated with the static image, regardless of whether the static image is deleted. This is determined by the user selection.

Referring to FIGS. 11(a) to 11(c), the controller 180 edits only one portion of the moving image, regardless of the static image. For example, as illustrated in FIG. 11(a), a graphic object 1100 relating to one portion of the moving image is output to the display unit 151.

As illustrated in FIG. 11(b), when the touch is applied to the graphic object 1100, the controller 180 outputs a list of functions relating to the editing of one portion of the moving image that is associated with the static image. When the touch is applied to one function in the list, the controller 180 executes the function to which the touch is applied. For example, as illustrated in FIG. 11(c), one portion of the moving image that is associated with the static image is deleted. At this time, the static image may not be deleted regardless of whether one portion of the moving image that is associated with the static image is deleted. Furthermore, the controller 180 outputs alerting information 1120 that alerts the user that the one portion of the moving image is deleted.

The function of separately editing only one portion of the moving image that is associated with the static image is described above. That is, even after one portion of the moving image is associated with the static image, the user can separately edit only the one portion of the moving image.

According to the present invention, when the static image is captured, at least one portion of the moving image that is captured together when the static is captured is matched with the static image, and thus the one portion of the moving image that is matched with the static image is provided along with the static image. When this is done, the user can obtain, in a more realistic manner, information relating to the environment and the situation where the static image is captured.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a camera;
   a display; and
   a controller capable of:
   capturing a moving image using the camera, based on a predetermined condition;
   capturing a static image in response to a control input, while the moving image is captured in the background;
   associating at least a part of the captured moving image with the static image, wherein the at least part of the captured moving image is captured for a predetermined time that is set based on a time point at which the control input is applied,
   displaying, on the display, the static image among a plurality of static images in a memory;
   receiving a predetermined-type touch input applied to a region comprising the static image displayed on the display; and
   reproducing the at least part of the captured moving image in response to the predetermined-type touch input, wherein the controller recognizes pupils of user's eyes using the camera, and in response to detection of the recognized pupils as being fixed on the static image for a predetermined time, the controller reproduces one portion of the captured moving image associated with the static image.

2. The mobile terminal of claim 1, wherein the controller matches with the static image the at least part of the captured moving image that has been captured for a predetermined time, with a point in time at which the control input is applied serving as a reference.

3. The mobile terminal of claim 1, wherein the controller outputs a graphic object indicating that the captured moving image is associated with one region of the static image being output.

4. The mobile terminal of claim 3, wherein when a touch is applied to the graphic object, the controller outputs the at least part of the captured moving image that is associated with the static image.

5. The mobile terminal of claim 4, wherein if one portion of the captured moving image that corresponds to the static image is output while the moving image is reproduced, the controller performs different visual processing to the one portion of the captured moving image than when the other portions of the captured moving image are output, in such a manner that the static image corresponding to the one portion of the captured moving image is obtained.

6. The mobile terminal of claim 4, wherein when the outputting of one portion of the captured moving image that is associated with the static image is finished, the controller outputs the static image with which the one portion of the moving image is associated, back to the display.

7. The mobile terminal of claim 1, wherein when the capturing of the static image is completed, the controller outputs to one portion of an output region of the display multiple graphic objects that correspond to time periods at which the captured moving image is captured, respectively, in order that the at least part of the captured moving image that is processed to be associated with the static image is selected, and wherein when a predetermined-type touch is applied to at least one or more, among the multiple graphic objects, the controller performs processing that associates with the static image one portion of the captured moving image that corresponds to the graphic object to which the predetermined-type touch is applied.

8. The mobile terminal of claim 1, wherein at least one portion of the captured moving image that is processed to be associated with the static image is one portion of the captured moving image that corresponds to one already-selected portion of the static image.

9. The mobile terminal of claim 8, wherein when a predetermined-type touch is applied to one portion of the static image being output, the controller extracts at least one portion of the moving image that corresponds to the one portion of the captured moving image, to which the touch is applied, and performs processing that associates the one extracted portion of the moving image with one portion of the static image.

10. The mobile terminal of claim 9, wherein a graphic object indicating that the one extracted portion of the moving image is associated is output to the vicinity of one portion of the static image with which the one extracted portion of the moving image is associated.

11. The mobile terminal of claim 10, wherein when a predetermined-type touch is applied to the graphic object, the controller outputs the one extracted portion of the moving image to one portion of an output region of the display, which corresponds to the one portion of the static image.

12. The mobile terminal of claim 1, wherein image frames that result from recording light reflected from objects and performing digital processing are sequentially output to the display, and wherein the controller enlarges one portion of the image frame when a touch is applied to one portion of an output region of the display, the controller captures the static image, based on a control input that is applied in a state where the one portion of the image frame is enlarged, and the controller performs processing that associates at least one portion of the moving image that is captured from the image frames that are sequentially output from the camera and that are not enlarged, with the static image that is captured in the state where the one portion of the image frame is enlarged, regardless of the enlarged static image.

13. The mobile terminal of claim 12, wherein when a control for outputting at least one portion of the moving image that is associated with the enlarged static image is applied, the controller outputs the at least one portion of the moving image, and wherein while the at least one portion of the moving image is output, the enlarged static image is output to one portion of the output region of the display.

14. The mobile terminal of claim 1, wherein the number of the cameras each of which has a different image-capturing direction is two or greater, wherein among the at least two cameras, one camera, captures the moving image, and the other camera captures the static image, based on a control input that is applied while the one camera captures the moving image, and wherein, the controller performs processing that associates the moving image captured by the other camera with the static image captured by the one camera in such a manner that information relating to the moving image is provided to the static image.

15. The mobile terminal of claim 1, wherein in response to activation of the camera, the moving image is captured in the background.

16. A method of controlling a mobile terminal, comprising:
- activating a camera;
- capturing a moving image in the background using the camera, based on predetermined condition;
- capturing a static image in response to a control input from a controller while the moving image is captured in the background;
- associating at least a part of the captured moving image with the static image, the at least part of the captured moving image is captured for a predetermined time that is set based on a time point at which the control input is applied;
- displaying, on a display, the static image among a plurality of static images in a memory;
- receiving a predetermined-type touch input applied to a region comprising the static image displayed on the display; and
- reproducing the captured moving image in response to the predetermined-type touch input, wherein the controller recognizes pupils of user's eyes using the camera, and in response to detection of the recognized pupils as being fixed on the static image for a predetermined time, the controller reproduces one portion of the captured moving image associated with the static image.

17. The method of 16, wherein the at least one portion of the moving image that is associated with the static image is one portion of the moving image that has been captured for a predetermined time, with a point in time at which the user request is received serving as a reference.

18. The method of claim 16, wherein a graphic object indicating that the captured moving image is associated with the static image is output to one portion of an output region of the display.

19. The method of claim 18, wherein when a predetermined-type touch is applied to the graphic object, the captured moving image that is associated with the static image is output.

* * * * *